US012669589B2

(12) United States Patent
Paesen et al.

(10) Patent No.: US 12,669,589 B2
(45) Date of Patent: Jun. 30, 2026

(54) METHOD AND DEVICE FOR DETERMINING DISTANCES TO A SCENE

(71) Applicant: XENOMATIX NV, Leuven (BE)

(72) Inventors: Rik Paesen, Diepenbeek (BE); Dirk Van Dyck, Aartselaar (BE); Stijn Vandewiele, Ledeberg (BE); Nick Van Den Broeck, Boutersem (BE)

(73) Assignee: XENOMATIX NV, Leuven (BE)

( * ) Notice: Subject to any disclaimer, the term of this patent is extended or adjusted under 35 U.S.C. 154(b) by 1147 days.

(21) Appl. No.: 17/642,365

(22) PCT Filed: Sep. 23, 2020

(86) PCT No.: PCT/EP2020/076455
§ 371 (c)(1),
(2) Date: Mar. 11, 2022

(87) PCT Pub. No.: WO2021/058494
PCT Pub. Date: Apr. 1, 2021

(65) Prior Publication Data
US 2022/0326358 A1      Oct. 13, 2022

(30) Foreign Application Priority Data
Sep. 25, 2019   (EP) ..................................... 19199701

(51) Int. Cl.
*G01C 3/08* (2006.01)
*G01S 7/4863* (2020.01)
(Continued)

(52) U.S. Cl.
CPC ............ *G01S 7/4863* (2013.01); *G01S 17/18* (2020.01); *G01S 17/89* (2013.01)

(58) Field of Classification Search
CPC ......... G01S 7/4863; G01S 17/18; G01S 17/89
See application file for complete search history.

(56) References Cited

U.S. PATENT DOCUMENTS

2018/0045513 A1*   2/2018   Kitamura ................. G01C 3/06
2018/0053799 A1    2/2018   Otani et al.

FOREIGN PATENT DOCUMENTS

CN      110221274 A     9/2019
EP         3301477 A1 *   4/2018   ........... G01S 7/4865
(Continued)

OTHER PUBLICATIONS

ISR and Written Opinion in corresponding PCT Application No. PCT/EP2020/076455, dated Dec. 18, 2020.
(Continued)

*Primary Examiner* — Mark Hellner
(74) *Attorney, Agent, or Firm* — BACON & THOMAS, PLLC

(57)      ABSTRACT
A method and device for determining distances to a scene determines a laser light pulse width PW that is smaller than a maximum time of flight TOFmax corresponding to a maximum distance Dmax by using a pulse width reduction factor N such that PW=(TOFmax−TDL)/N wherein TDL is a predefined delay window, determines a pulse frequency FP such that FP≤1/((N+1)×PW+TDL), illuminates the scene with an illuminating pattern comprising a plurality of spatially separated pulsed laser beams having the determined pulse width and frequency, performs the detection as function of time during a detection time period TD divided in M=α×(N+1) consecutive detection time windows, with α≥1, such that TD=M×(PW/α), identifies in what detection time windows reflected laser light is detected, and calculates a distance to the scene based on this identification.

23 Claims, 9 Drawing Sheets

(51) Int. Cl.
 *G01S 17/18*      (2020.01)
 *G01S 17/89*      (2020.01)

(56)                 References Cited

FOREIGN PATENT DOCUMENTS

| EP | 3330739 A1 | 6/2018 |
| WO | 2017068199 A1 | 4/2017 |
| WO | 2019115839 A1 | 6/2019 |

OTHER PUBLICATIONS

Second Written Opinion in corresponding PCT Application No. PCT/EP2020/076455, dated Sep. 1, 2021.
International Preliminary Report on Patentability in corresponding PCT Application No. PCT/EP2020/076455, dated Jan. 4, 2022.
EP Search Report in corresponding EP Application No. 19199701.4, dated Apr. 2, 2020.

* cited by examiner

METHOD AND DEVICE FOR DETERMINING DISTANCES TO A SCENE

FIELD OF THE INVENTION

The present disclosure relates to a system for determining a distance to a scene. More particularly, the invention relates to a time-of-flight based sensing method using laser light to illuminate the scene and detect reflected laser light. The invention is also related to a LIDAR device to detect distances to one or more objects of a scene.

BACKGROUND OF THE INVENTION

A device based on active illumination for determining a distance of a scene is also known as a LIDAR (Light Detection And Ranging) device. LIDAR devices measure the distance to a scene by illuminating the scene with laser light and by detecting reflected laser light in a detector generally located near the laser source that emitted the laser light. Hence, the time interval between the emission of the laser light and the detection of reflected laser light is proportional with twice the distance to an object of the scene or to a part of the scene that reflected the laser light.

Most known LIDAR devices make use of a direct TOF (DToF) method. These systems comprise a powerful pulsed laser, operating in a nanosecond pulse regime, a mechanical scanning system to scan the pulsed laser beam, and a pulse detector. Systems of this type are presently available from vendors including Velodyne LIDAR of Morgan Hill, California. The Velodyne HDL-64E, as an example of state-of-the-art systems, uses 64 high-power lasers and 64 avalanche diode detectors in a mechanically rotating structure at 5 to 15 rotations per second.

These DToF system have a number of drawbacks. For example, these systems require lasers having a power level that is too high to be obtained with currently available semiconductor lasers, whose power level is orders of magnitude lower. In addition, the use of mechanically rotating elements for scanning purposes further limits the prospects for miniaturization, reliability, and cost reduction of this type of system.

Compactness of the LIDAR device is an important factor for applications in the automotive sector where the LIDAR device is for example to be coupled to the front windshield of the car or to be coupled to a bumper of the car. Indeed, LIDAR devices are a key factor for the development autonomous driving or driver assistance systems. In this context, LIDAR devices are used to detect obstacles, such as other vehicles or objects in the environment of the vehicle.

In WO2017/068199, a LIDAR device is proposed that is using semiconductor lasers and a CMOS-based multi-well pixel detector. This allows to manufacture a compact LIDAR device where the illumination system and the detection system are placed together in a compact housing. The device disclosed in WO2017/068199 uses a projector configured for illuminating the scene with an illuminating pattern formed by a plurality of spatially separated pulsed laser light being emitted simultaneously in a spot pattern. The pulses of laser light are emitted as a pulse train, i.e. a sequence of pulses are emitted at a given pulse frequency. The CMOS-based multi-well pixel detector is detecting spots of reflected laser light representing the spatially separated pulses or part of the spatially separated pulses as reflected by the scene. In this way, a depth map of the scene can be obtained without using any rotating or mechanical scanning element.

The principle of the illumination and detection method used in WO2017/068199 is shown on FIG. 1 where an emitted laser pulse and a reflected pulse are identified with reference numbers 11 and 12, respectively. This FIG. 1 is only a schematic figure and the reflected pulse 12 has generally a smaller amplitude when compared to the amplitude of the emitted pulse 11. This method is also named range-gating method. The detector is configured for detecting a first amount of electrical charges representative of a first amount of reflected laser light obtained during a first time window TW1 and a second amount of electrical charges representative of a second amount of reflected laser light obtained during a second time window TW2. The second time window is occurring after the first time window and the width of the two time windows is equal to the pulse width PW of the laser pulses. Processing means allow for calculating the distance to an object of the scene based on the first and second amount of electrical charges.

In WO2017/068199, the scene is illuminated with a sequence of pulses. In this way, sufficient charges in the first TW1 and second TW2 time window can be accumulated to obtain a signal to noise ratio that allows calculating the distance to an object of the scene. The illumination of a scene with the sequence of pulses, the accumulation of reflected laser light, the readout of the charges and the calculation of a distance based on the accumulated charges is generally named a frame or a frame measurement. However, when performing a single frame measurement, the precision of the obtained distance, also named temporal precision or temporal error, is low. Indeed, when generating multiple frames, there is a large spread on the measured distances from frame to frame. In other words, the temporal error, being the sigma value $\sigma$ of the measurement distribution is large. Therefore, multiple frames are always taken and an average object distance is determined. In this way, the error on the average object distance value is reduced with a factor $1/\sqrt{N_F}$ when compared to the error of a single frame measurement, with $N_F$ being the number of frames. For a perfectly calibrated LIDAR device, the calculated average distance, obtained from the multiple frames, is equal to the real distance within a confidence interval determined by the standard deviation $\sigma_{avg}=\sigma/\sqrt{N_F}$.

The LIDAR device disclosed in WO2017/068199 has a number of advantages when compared to the DToF system mentioned above. Indeed, such a solid state LIDAR device is compact, robust and can be produced in a cost-effective way. These type of LIDAR devices have however also a disadvantage, namely the fact that a large number of frames need to be taken to obtain an acceptable spatial accuracy. This strongly reduces the overall response time of the LIDAR detector and limits the number of points that can be measured within a given time period.

Therefore, there is a need to improve such a compact LIDAR device, more precisely, there is a need to have these type of LIDAR devices to be operable in a broad range of distances, including distances equal or above 100 meter, and to perform distance measurements with a high precision.

SUMMARY OF THE INVENTION

It is an object of the present disclosure to provide a method for determining distances to one or more objects in a scene, more specifically to determine object distances with a high precision such that an acceptable spatial accuracy can be obtained with a limited number of frames, even with a single frame measurement. In other words, the purpose is to reduce the temporal error σ mentioned above. It is a further object to provide a LIDAR device comprising detection and processing means for determining object distances with a high precision such that the number of frames to be taken can be strongly reduced or even limited to a single frame measurement.

The present invention is defined in the appended independent claims. The dependent claims define advantageous embodiments.

According to a first aspect of the invention a method for determining distances to one or more objects in a scene by illuminating the scene with pulsed laser light and detecting reflected laser light in relation to a time of flight of the laser light is provided, and wherein the one or more objects in the scene are located in a distance range between a minimum distance and a maximum distance and with $0 \leq D_{min} \leq 0.6 \times D_{max}$, preferably $0 \leq D_{min} \leq 0.4 \times D_{max}$, more preferably $0 \leq D_{min} \leq 0.2 \times D_{max}$, with $D_{min}$ and $D_{max}$ being respectively the minimum and the maximum distance defining the distance range.

The method according to the invention comprises steps of

A) determining a pulse width for the pulsed laser light that is smaller than a maximum time of flight associated to the maximum distance such that $$PW = (TOF_{max} - T_{DL})/N, \text{ with } TOF_{max} = 2 \times D_{max}/c,$$

wherein PW is the pulse width, $D_{max}$ is the maximum distance, c is the speed of light, $TOF_{max}$ is the maximum time of flight, $T_{DL}$ is a predetermined delay time window with $0 \leq T_{DL} \leq 2 \times D_{min}/c$, and N is a predefined pulse width reduction factor, B) determining a pulse frequency such that $F_P \leq 1/((N+1) \times PW + T_{DL})$, with $F_P$ being the pulse frequency and wherein $F_P = 1/P_P$, with $P_P$ being a pulse period, C) determining a detection time period for detecting reflected laser light within the pulse period ($P_P$) of the pulsed laser light, and wherein $T_D = (N+1) \times PW$, with $T_D$ being the detection time period, and dividing the detection time period in a number of consecutive detection time windows TW[i], with i=1 to M and M being the number of detection time windows, and wherein:

$$T_D = \sum_{i=1}^{i=M} TW[i], = M \times (PW/\alpha), \text{ and } M = \alpha \times (N+1)$$

with α being an integer number expressing a number of detection time windows selected per pulse width, with $\alpha \geq 1$, preferably $\alpha \leq 10$, more preferably $\alpha \leq 5$, and wherein α and N are selected such that $\alpha \times N \geq 2$, preferably $\alpha \times N \geq 3$, more preferably $\alpha \times N \geq 4$, D) illuminating the scene with a spot pattern formed by plurality of spatially separated pulsed laser beams, and wherein each pulsed laser beam is comprising a sequence of pulses having the pulse width determined in step A) and having the pulse frequency determined in step B), and wherein the pulses of each of the plurality of pulsed laser beams are emitted simultaneously, E) following each simultaneous emission of pulses when illuminating the scene as defined in step D), detecting spots of reflected laser during the consecutive detection time windows TW[i] of the detection time period ($T_D$)

defined in step C), and wherein the spots are representing the spatially separated pulsed laser beams as being reflected by the one or more objects in the scene, and for each simultaneous emission of pulses performing said detecting of spots of reflected laser light in synchronization with the emission of the pulses of the pulsed laser beams:

a) if the delay time window is zero then performing the synchronisation such that the first detection time window TW[1] is overlapping or at least partly overlapping with an emission time window of the pulses, and b) if the delay time window is not zero then performing the synchronisation such that the first detection time window TW[1] is delayed with respect to an emission time window of the pulses and with a delay equal to the delay time window, F) for each of the detected spots of reflected laser light, obtaining exposure values associated to the detection time windows TW[i] by accumulating amounts of reflected laser light as detected in the detection time windows TW[i], and wherein the accumulation is performed for all the pulses of the sequence of pulses, G) for each of the detected spots of reflected laser light:

i) identifying in what detection time windows of the consecutive detection time windows TW[i] reflected laser light is detected, ii) calculating an object distance based on the identified detection time windows, and wherein the object distance corresponds to a distance between a detector detecting the spot of reflected laser light and an object in the scene or a portion of an object in the scene having caused the reflected laser light being detected.

Advantageously, by reducing the pulse width of the laser pulses with respect to the maximum time of flight $TOF_{max}$, i.e. the $TOF_{max}$ corresponding to the maximum distance to be measured and reducing the detection time windows for detecting reflected laser light, the temporal precision of the distance determination, defined above as being the sigma value σ of the measurement distribution, is improved, i.e. reduced. In other words, the temporal precision is improved. This allows to reduce the number of frames to be taken or to perform even a single frame measurement. If the LIDAR device is perfectly calibrated and if only performing a single frame measurement, then the temporal precision is determining with what probability the measured distance value is equal to the real distance value.

Advantageously, the detection time period and the pulse frequency are defined such that reflected laser light resulting from objects located at the maximum distance, are detected within the detection time period before a subsequent laser pulse is emitted. This avoids aliasing problems.

Advantageously, with the method according to the invention, with the same sequence of laser pulses having the pulse width as claimed and with the detection time windows as claimed, objects can be detected over a broad range of distances, i.e. from short distances $D_{min}$ up to the maximum distance $D_{max}$.

The performance of the detection of the reflected laser light as function of time during a detection time period wherein the detection time period is divided in M consecutive detection time windows, wherein each detection time window has a time width essentially equal to the pulse width, i.e. α=1, has the additional advantage that the reflected laser light is detected in maximum two detection time windows. Hence, as M≥3, there is at least one detection time window that can be used as a background detecting time window such that no additional time slot is required to perform a background measurement.

Also if $\alpha > 1$, the reflected laser light is detected in maximum $\alpha+1$ detection time windows and hence the pulse width factor can be selected such that detection time windows are available for performing background measurements.

Advantageously, as due to the improved precision of the distance measurement, the number of frames can be reduced and hence the overall response time of the LIDAR device is improved.

The lower limit "0" for the minimum distance $D_{min}$ has to be construed as zero meter.

In embodiments, the minimum distance $D_{min}$ is equal to zero meter, and hence the delay time window $T_{DL}$ is set to zero nanoseconds.

In embodiments, $0.005 \times D_{max} \leq D_{min} \leq 0.6 \times D_{max}$. In other embodiments, $0.01 \times D_{max} < D_{min} \leq 0.6 \times D_{max}$. In further embodiments, $0.01 \times D_{max} < D_{min}$ $0.4 \times D_{max}$.

In embodiments, the product of N and a is equal or smaller than 1000, preferably equal or smaller than 500, more preferably equal or smaller than 100.

In embodiments, the predefined pulse width reduction factor N is equal or larger than 3 and in other embodiments N is equal or larger than four.

In some embodiments, the predefined pulse width reduction factor N is comprised within the following range: $2 \leq N \leq 20$, preferably $3 \leq N \leq 20$.

In embodiments, the maximum distance $D_{max}$ is comprised in a range: 30 meter $\leq D_{max} < 1000$ meter, preferably in a range 50 meter $\leq D_{max} < 500$ meter. The invention is however not limited to a specific maximum distance that is to be determined.

The detection time period $T_D$, as defined above and defined in the claims, has to be construed as a detection time period to detect reflected laser light, hence it does not exclude that additional detection time windows, subsequent to the detection time period $T_D$, are further used to detect for example background or perform other measurements.

In embodiments, the consecutive detection time windows TW[i], for i=1 to M, are of substantially equal duration.

In embodiments, for each of the consecutive detection time windows TW[i], with i=1 to M, $(|(PW/\alpha)-TW[i]|/(PW/\alpha)) \leq 0.10$, preferably $(|(PW/\alpha)-TW[i]|/(PW/\alpha)) \leq 0.05$, more preferably $(|(PW/\alpha)-TW[i]|/(PW/\alpha)) \leq 0.02$.

In embodiments, the method according to the invention is a method for determining distances to the one or more objects in the scene with a LIDAR device.

Remark that the method according to the invention is not limited to a specific order of the steps defined and the steps identified with the letters A) to G) are not to be construed as indicating a specific chronological order. For example steps A) to C) can be performed in a different order or be performed in parallel. The letters A) to G) are merely used to identify the different steps comprised by the method of the invention and these letters are used as a reference when for example those steps are further discussed in detail in the text.

In embodiments, the detection of reflected laser light is performed with a laser light receiving device comprising a multi-well pixel detector having a plurality of pixels, and wherein each pixel comprises a light-sensitive area and a plurality of charge storage wells W[i] with i=1 to $N_W$, with $N_W$ being the number of charge storage wells, and $N_W \leq M$, and wherein the plurality of charge storage wells are configured for storing charges detected by the light-sensitive area during the detection time period $T_D$. In preferred embodiments, $N_W < M$ and $M \geq 4$.

In embodiments according to the invention, in step C) if the integer number $\alpha$ is selected to be larger than one, then a is selected to be lower than $N_W$, preferably $\alpha=$Round $(N_W/2)$ with Round being a function for rounding the ratio $N_W/2$ to a nearest integer. If $N_W$ is odd, the rounding after division by two can be made to the lowest or to the highest integer.

In embodiments, each sub-sequence of $\alpha+1$ consecutive time windows TW[k] to TW[k+$\alpha$], with k=1 to M−$\alpha$, is associated to an unique sequence of $\alpha+1$ charge storage wells of the plurality of charge storage wells W[i] such that the detection time windows wherein reflected laser light is detected are unambiguously identifiable.

In embodiments wherein $\alpha=1$, each pair of successive detection time windows TW[k] and TW[k+1], with k=1 to M−1, is associated to an unique pair of charge storage wells of the plurality of charge storage wells W[i] such that the detection time windows wherein reflected laser light is detected are unambiguously identifiable.

In embodiments wherein $\alpha=1$, in step A) the pulse width reduction factor N is defined such that $N \leq N_W!/((N_W-2)! \times 2)$, if the number of charge storage wells is odd, or $N \leq [N_W!/((N_W-2)! \times 2)]-[(N_W!/((N_W-1)! \times 2))-1]$, if the number of charge storage wells is even.

In embodiments, in step G) ii), the calculation of the object distance is based on the identified detection time windows and/or based on the exposure values obtained for at least an earliest and a last detection time window wherein reflected laser light is identified. In some embodiments, the calculation of the object distance is based on a counting of the number of detection time windows preceding an earliest detection time window wherein reflected laser light is identified.

According to a second aspect of the invention, a LIDAR device for determining distances to one or more objects of a scene is provided. Such a LIDAR device comprises a projector configured for illuminating the scene with a spot pattern formed by a plurality of spatially separated pulsed laser beams wherein each pulsed laser beam comprises a sequence of pulses having a pulse width, and wherein the pulses of each of the plurality of pulsed laser beams are emitted simultaneously, a light receiving device comprising a CMOS-based multi-well pixel detector configured for detecting spots of reflected laser light representing the spot pattern as reflected by the one or more objects of the scene, and a controller for controlling the projector and the light receiving device so as to detect and accumulate the reflected laser light in synchronization with the simultaneous emission of the pulses of the pulsed laser beams.

The LIDAR device according to the invention is characterized in that the CMOS-based multi-well pixel detector is configured and operable for detecting reflected laser light during a detection time period that falls within the pulse period of the pulsed laser beams, and wherein the detection time period is divided in a number of consecutive detection time windows TW[i] with i=1 to M, M being the number of detection time windows with $M \geq 3$, preferably $M \geq 4$, more preferably $M \geq 5$ and wherein $$T_D = \sum\nolimits_{i=1}^{i=M} TW[i] = M \times PW/\alpha,$$

PW being the pulse width, $T_D$ being the detection time period and $\alpha$ is an integer number with $\alpha \geq 1$, preferably $\alpha \leq 10$, more preferably $\alpha \leq 5$.

The consecutive detection time windows TW[i], for i=1 to M, are of substantially equal duration. In embodiments, for each of the detection time windows TW[i], with i=1 to M, $(|PW-TW[i]|/PW) \leq 0.10$, preferably $(|PW-TW[i]|/PW) \leq 0.05$, more preferably $(|PW-TW[i]|/PW) \leq 0.02$.

The CMOS-based multi-well pixel detector is further configured and operable, for each of the detected spots of reflected laser light, for obtaining exposure values associated to the detection time windows TW[i] by accumulating amounts of electrical charge representative of reflected laser light as detected in the detection time windows TW[i], and wherein the accumulation is performed for all the pulses of the sequence of pulses.

The LIDAR is also characterized in that the controller is configured for performing the synchronisation such that i) either the first detection time window TW[1] is overlapping or at least partly overlapping with a pulse emission time window of the pulses or, alternatively, such that ii) the first detection time window TW[1] is delayed with respect to an emission time window of the pulses and the delay is equal to a predefined delay time window.

Preferably, the predetermined delay time factor is equal or lower than $2 \times D_{min}/c$, which $D_{min}$ being a minimum distance and c the speed of light, such that objects located at or near the minimum distance $D_{min}$ can be detected and the distance be determined.

The LIDAR device according to the invention is further characterized in that it comprises processing means configured to, for each of the detected spots of reflected laser light, i) identify in what detection time windows of the consecutive detection time windows the exposure values representing reflected laser light are obtained, ii) calculating an object distance to an object of the scene based on the identified detection time windows and/or the charge accumulated in those identified detection time windows.

In embodiments, the CMOS-based multi-well pixel detector comprises multiple pixels and wherein each pixel comprises a light-sensitive detection area and a plurality of charge storage wells W[i], with i=1 to $N_W$ and $N_W$ being the number of charge storage wells with $N_W \leq M$, and wherein the plurality of charge storage wells are configured for storing charges detected by the light-sensitive area during the detection time period. In preferred embodiments with $N_W < M$ and $M \geq 4$.

In embodiments comprising such a CMOS-based multi-well pixel detector and wherein $N_W < M$ and $M \geq 4$, each sub-sequence of $\alpha+1$ consecutive time windows TW[k] to TW[k+$\alpha$], with k=1 to M-$\alpha$, is associated to an unique sequence of $\alpha+1$ charge storage wells of the plurality of charge storage wells W[i] such that the detection time windows wherein reflected laser light is detected are unambiguously identifiable.

In embodiments, wherein $M \geq 4$ and $\alpha=1$, for each pixel of the multi-well pixel detector $N_W < M$, each pair TW[k] and TW[k+1] of successive time windows of the detection time windows is associated to an unique pair W[m] and W[n] of the charge storage wells such that the detection time windows wherein reflected laser light is detected are unambiguously identifiable.

In embodiments wherein $\alpha=1$, the number of charge storage wells $N_W$ and the number of detection time windows M are defined as follows: $N_W=3$ and M=4, or $N_W=4$ and $5 \leq M \leq 6$, or $N_W=5$ and $7 \leq M \leq 11$.

In preferred embodiments, the LIDAR device is configured such that the number of detection time windows M and the pulse width PW are related and this relation is defined as: $PW=(TOF_{max}-T_{DL})/((M-\alpha)/\alpha)$, with $TOF_{max}=2 \times D_{max}/c$, wherein $TOF_{max}$ is a maximum time of flight and $D_{max}$ is a maximum distance associated to the maximum time of flight, c is the speed of light, and $T_{DL}$ is the predefined delay time window with $0 \leq T_{DL}$ ($0.6 \times TOF_{max}$), preferably $0 \leq T_{DL} \leq$ ($0.4 \times TOF_{max}$), more preferably $0 \leq T_{DL} \leq (0.2 \times TOF_{max})$. The maximum distance is an operational range of the LIDAR device, generally a maximum operational range of the LIDAR device.

In embodiments, this maximum distance $D_{max}$, which is corresponding to a maximum operational range of the LIDAR device, is within the following range: 30 meter$\leq D_{max} \leq$1000 meter, preferably in a range: 50 meter$\leq D_{max} \leq$500 meter.

In embodiments, the projector is configured for providing the pulsed laser beams at a pulse frequency $F_P$ such that $F_P \leq 1/((M/\alpha) \times PW+T_{DL})$.

In embodiments, the laser light produced by the pulsed laser beams has a wavelength between 800 nm and 1600 nm.

In embodiments according to the present invention $\alpha \geq 2$.

The invention also relates to a vehicle comprising a LIDAR device according to the invention.

BRIEF DESCRIPTION OF THE DRAWINGS

These and further aspects of the present disclosure will be explained in greater detail by way of example and with reference to the accompanying drawings in which.

The drawings of the figures are neither drawn to scale nor proportioned. Generally, identical components are denoted by the same reference numerals in the figures.

DETAILED DESCRIPTION OF THE INVENTION

Figure 1:
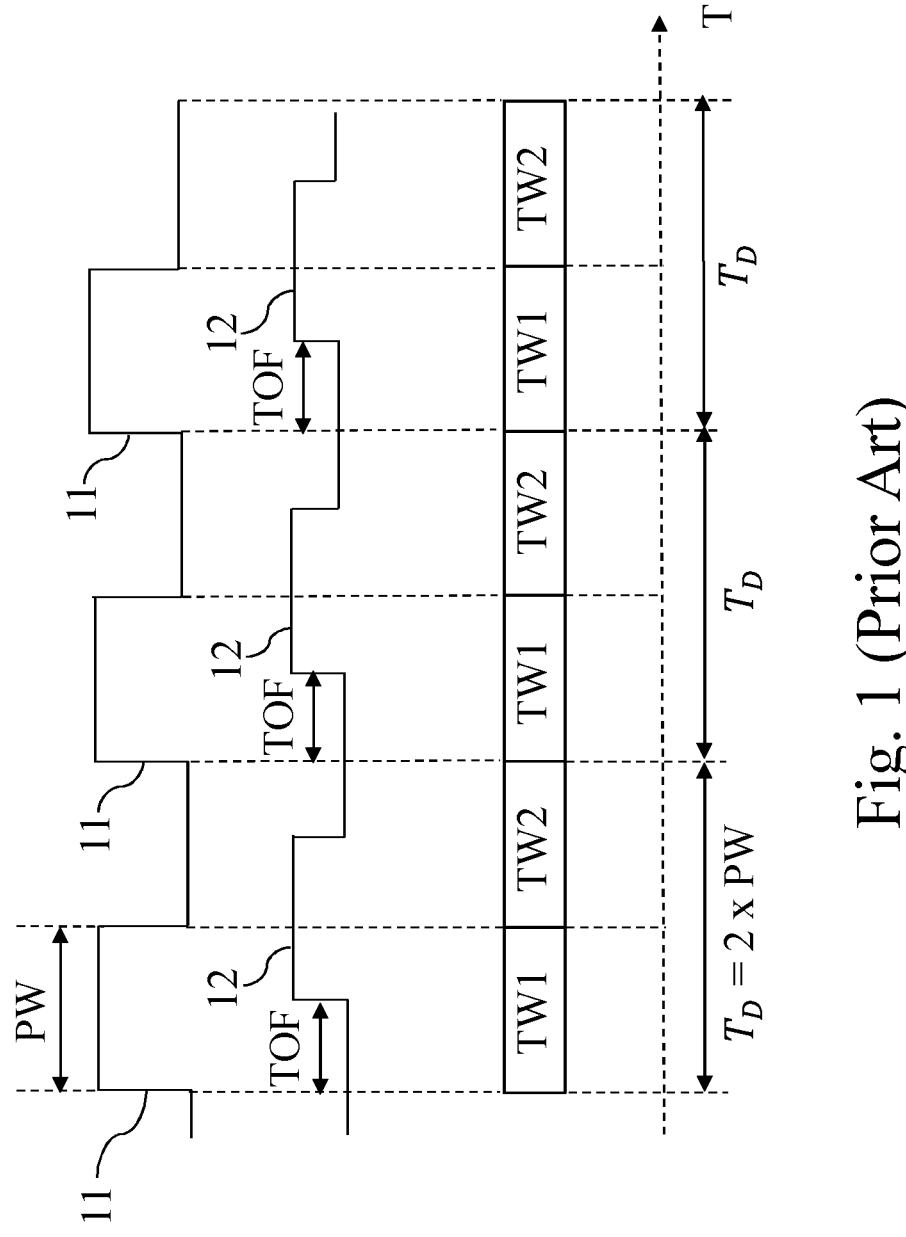
FIG. 1 schematically illustrates a prior art timing diagram for light illumination and detection, FIG. 2 schematically illustrates an example of a sequence of pulses forming a pulse train, FIG. 3 schematically illustrates a repetition of a number of frames, FIG. 4 schematically illustrates various timing diagrams for pulse emission and detection according to embodiments of the present invention, FIG. 5 schematically illustrates further examples of timing diagrams for pulse emission and detection according to the invention, FIG. 6 schematically illustrates a timing diagram for pulse emission and detection wherein a delay exists between the pulse emission time window and the first detection time window for detecting reflected laser light, FIG. 7 schematically illustrates two examples of a plurality of detector wells associated to a given number of detection time windows, FIG. 8 schematically illustrates an example of a timing diagram for pulse emission and detection wherein $\alpha=2$, FIG. 9 schematically illustrates a reduction of the temporal error of a distance measurement with the method according to the invention, FIG. 10 schematically illustrates a LIDAR device according to embodiments of the present invention.

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

When the word pulse width is used such as in a pulse width of a pulse of a pulsed laser beam, it has to be construed as a temporal pulse width, expressed in time units, for example expressed in nanoseconds.

Method for Determining Distances to a Scene, General

According to a first aspect of the invention, a method is provided for determining distances to one or more objects of a scene. A scene is for example an area as observed by a LIDAR device mounted to a windshield or a bumper of a car. Depending on the field of view of the LIDAR device, the scene can cover a large area or a smaller area. A field of view for automotive applications is for example 30°×10° or 120°×30° or any other suitable field of view. The scene can comprise for example various objects being located at different distances from the LIDAR device or few objects or only one object. The method aims at performing a distance mapping of the scene thereby identifying different distances to objects or distances to portions of the scene. The method according to the invention is not limited to LIDARS for automotive applications but the method can also be applied to other domains where LIDARS are for example mounted on airplanes or satellites.

The method comprises a step of illuminating the scene with a spot pattern formed by a plurality of spatially separated pulsed laser beams. Each pulsed laser beam comprises a sequence of pulses having a pulse width PW and a pulse frequency $F_P$. The pulses of each of the plurality of pulsed laser beams are emitted simultaneously. Such a sequence of pulses is also named pulse train and an example of a pulse train 50 is schematically shown on FIG. 2. In this illustrative example, only 5 pulses are shown, in practice however the number of pulses in a pulse train is generally much larger. For example, in some embodiments, the number of pulses in a pulse train is ranging between 50 and 500 pulses. The pulse with PW of the pulse 11 and the pulse period $P_P$, being the inverse of the pulse frequency $F_P$, are indicated on FIG. 2.

Figures 2, 3:
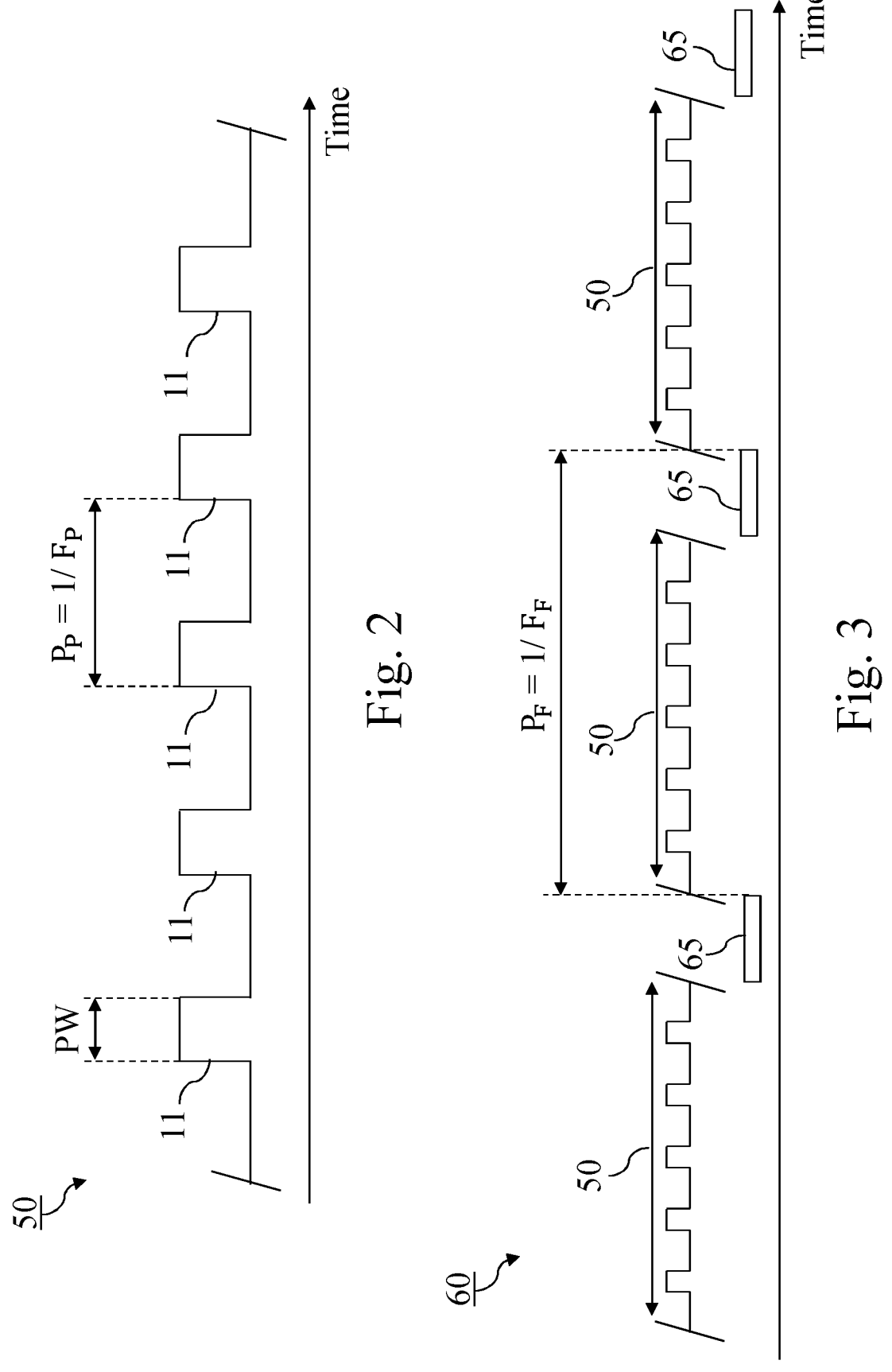

In embodiments, as shown on FIG. 2, the pulses are block pulses, i.e. rectangular shaped pulses. The invention is however not limited to the specific shape of the pulses. In other embodiments, the pulses can have another shape.

In embodiments, the wavelength of the laser light produced by the laser beams forming the discrete spot pattern is between 800 nm and 1600 nm.

In a further step, spots of reflected laser light are detected. These spots represent the spot pattern as being reflected by the one or more objects in the scene or by a portion of the one or more objects in the scene. This detection is performed within each pulse period $P_P$ of the pulsed laser beams and in synchronization with the simultaneous emission of the pulses of the pulsed laser beams.

The detection of the reflected laser light is for example performed with a light receiving device comprising a CMOS-based multi-well pixel detector and optical elements such as one or more optical lenses and a narrowband filter. A light receiving device that can be used to apply the method according to the invention will further be discussed below in more detail.

The method according to the present invention comprises a step of determining an optimum pulse width PW for the pulsed laser light generated by the pulsed laser beams for forming the spot pattern illuminating the scene.

According to the method of the invention, the pulse width PW is determined in relation with a maximum distance $D_{max}$. Indeed, the one or more objects in the scene are located at distances $D_s$ in a distance range between a minimum distance $D_{min}$ and a maximum distance $D_{max}$. Generally, $0 \leq D_{min} \leq 0.6 \times D_{max}$, preferably $0 \leq D_{min} \leq 0.4 \times D_{max}$, more preferably $0 \leq D_{min} \leq 0.2 \times D_{max}$. In other words, the objects can be located at different distances and the method allows to determine the distances to the one or more objects, at whatever distance between $D_{min}$ and $D_{max}$, the one or more objects are actually located.

This maximum distance can be construed as a required maximum operational range, i.e. the maximum distance corresponds to the maximum distance to the scene that still should unambiguously be measurable. For example if $D_{max}$ is defined to be 100 meter, it means that objects in the scene located at 100 meter or less should be detectable and the distance be measurable according to the method of the invention, while distances to objects in the scene located further away than the maximum distance do not need to be able to be determined. For the method according to the invention, this maximum distance is typically equal or larger than 50 meter and generally equal or shorter than 500 meter. But depending on the application, the maximum distance to be measured could also be larger, for example 1000 meter or even more. The method according to the invention is not limited by a specific maximum distance.

According to the method of the invention, the pulse width PW is set to be smaller than a maximum time of flight $TOF_{max}$ associated to the maximum distance $D_{max}$. When the laser light is detected after having been emitted and reflected back by the object, it has travelled a distance that is double the distance to the object. Hence, $TOF_{max}$ is equal to $(2 \times D_{max}/c)$, wherein c is the speed of light. The pulse width PW is set to be equal to $[TOF_{max} - T_{DL}]/N$ and N is a predefined pulse width reduction factor and $T_{DL}$ is a predetermined delay time window.

The predetermined delay time factor is generally equal or lower than $2 \times D_{min}/c$ such that objects located at or near the minimum distance $D_{min}$ can be detected and the distance be determined.

Figure 4:
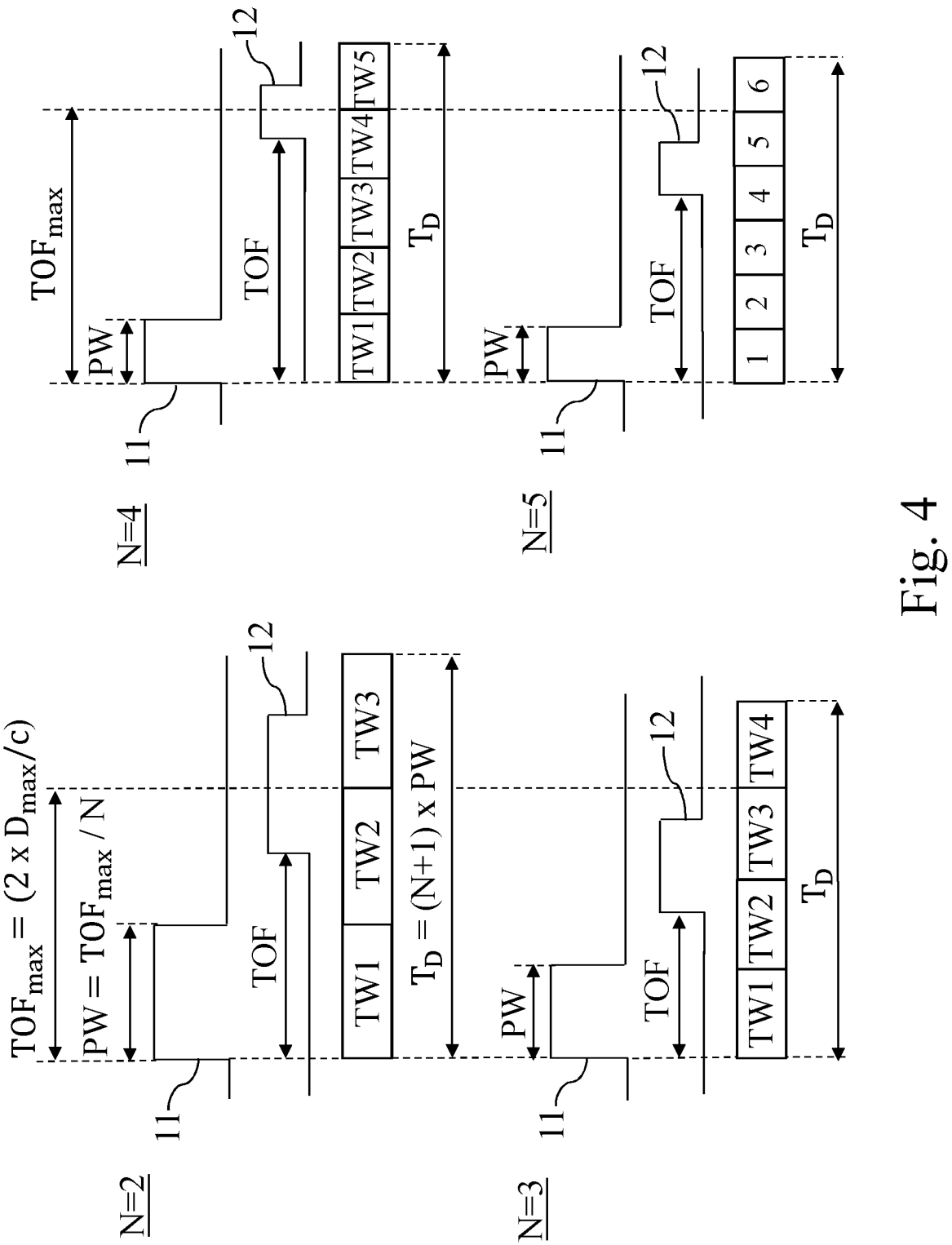

In FIG. 4 embodiments are shown wherein the predetermined delay time window is zero. As schematically illustrated on FIG. 4, in this case, the pulse width reduction factor N corresponds to the ratio between the maximum measurable time of flight $TOF_{max}$ and the pulse width PW of the emitted laser pulse 11.

According to the method of the invention, for each of the detected spots of reflected laser light, exposure values as function of time are obtained.

The method according to the invention comprises a step of determining a detection time period $T_D$ that falls within the pulse period $P_P$ of the pulsed laser beams for detecting reflected laser light and further comprises dividing the detection time period $T_D$ in M consecutive detection time windows TW[i], with i=1 to M, with M being the number of detection time windows and wherein $M=\alpha \times (N+1)$. The detection time period $T_D$ is expressed as:

$$T_D = \sum_{i=1}^{i=M} TW[i] = M \times (PW/\alpha),$$

wherein $\alpha$ is an integer number with $\alpha \geq 1$. The factor $\alpha$ is expressing the number of time windows per pulse width. Both embodiments wherein $\alpha=1$ and embodiments wherein $\alpha>1$ will be further discussed here below.

In embodiments wherein $\alpha=1$ then, the predefined pulse width reduction factor N is generally equal or larger than two, preferably equal or larger than three and more preferably equal or larger than four.

In embodiments, $\alpha$ and N are selected such that $\alpha \times N \geq 2$, preferably $\alpha \times N \geq 3$, more preferably $\alpha \times N \geq 4$.

Each of the detection windows TW[i] has to be construed as a time period. In embodiments, the consecutive detection time windows TW[i], for i=1 to M, are of substantially equal duration.

In FIG. 4, a number of examples of detection time windows are shown for values of N going from 2 to 5 and for $\alpha=1$. The embodiments shown on FIG. 4 are embodiments wherein the predetermined delay time window is zero.

Figure 6:
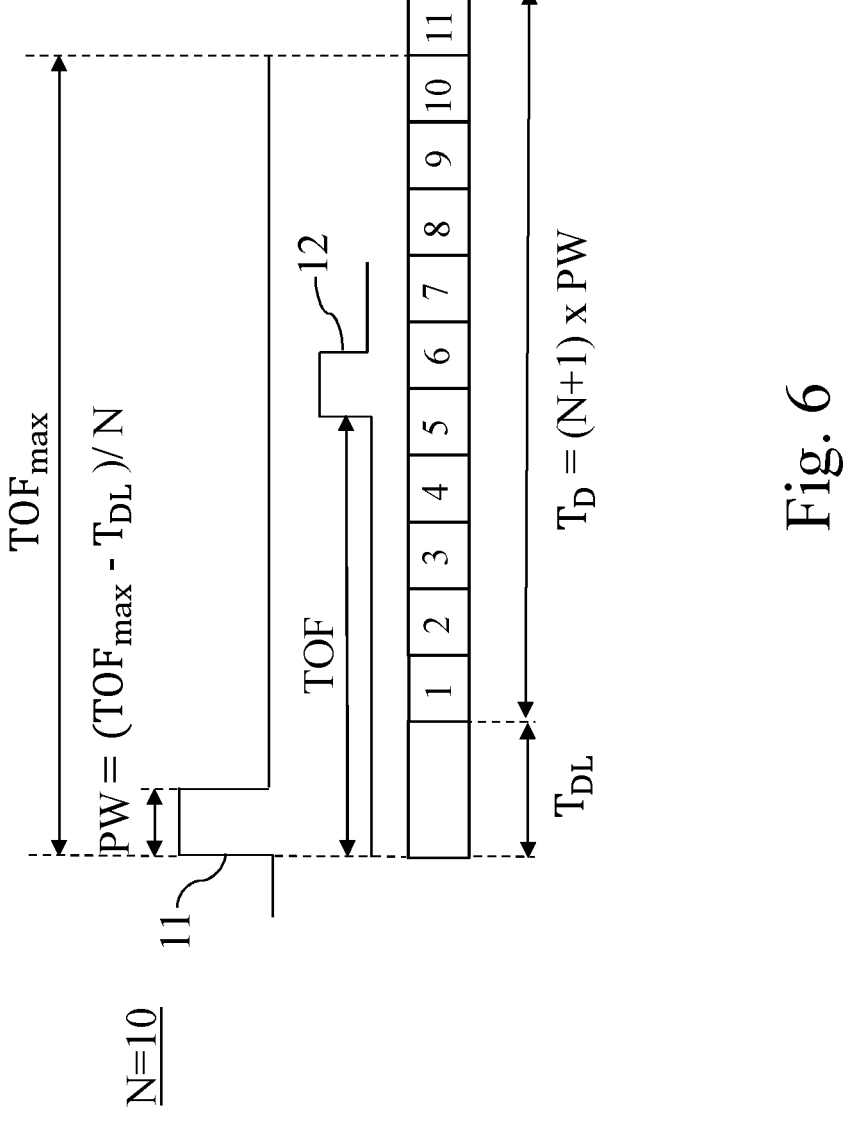

In FIG. 6, an example of an embodiment is shown where the predetermined delay time window $T_{DL}$ is not zero. In embodiments, $0 \leq T_{DL} 0.6 \times TOF_{max}$, preferably $0 \leq T_{DL} \leq 0.4 \times TOF_{max}$, more preferably $0 \leq T_{DL} \leq 0.2 \times TOF_{max}$. The person skilled in the art will select to apply or not to apply a delay time window $T_{DL}$ depending on the detection equipment used and depending on the range of object distances that need to be measured with the same equipment. For example, if the purpose is to measure object distances in a range between a minimum distance $D_{min}$ equal to 10% of $D_{max}$ and the maximum distance $D_{max}$ then a time delay of 10% of $TOF_{max}$ can be set to reduce the number of pixel wells of the detector used to detect the reflected laser light, as will be further discussed below. On the other hand, if objects can be located and need to be detected at any distance between 0 meter, i.e. $D_{min}=0$, and the maximum distance $D_{max}$, then the person skilled in the art can choose not to implement a delay time window.

Figure 5:
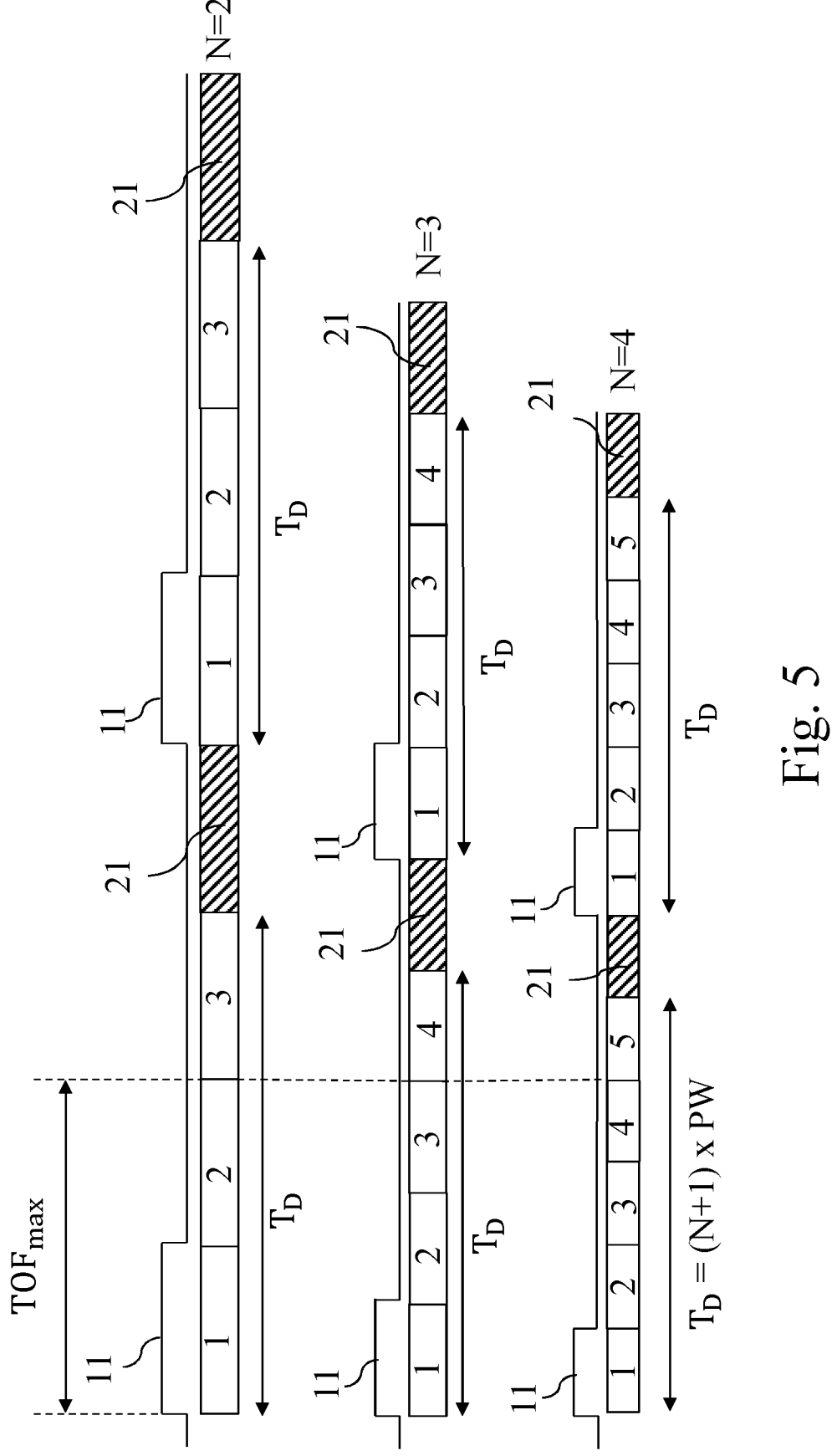
Figure 8:
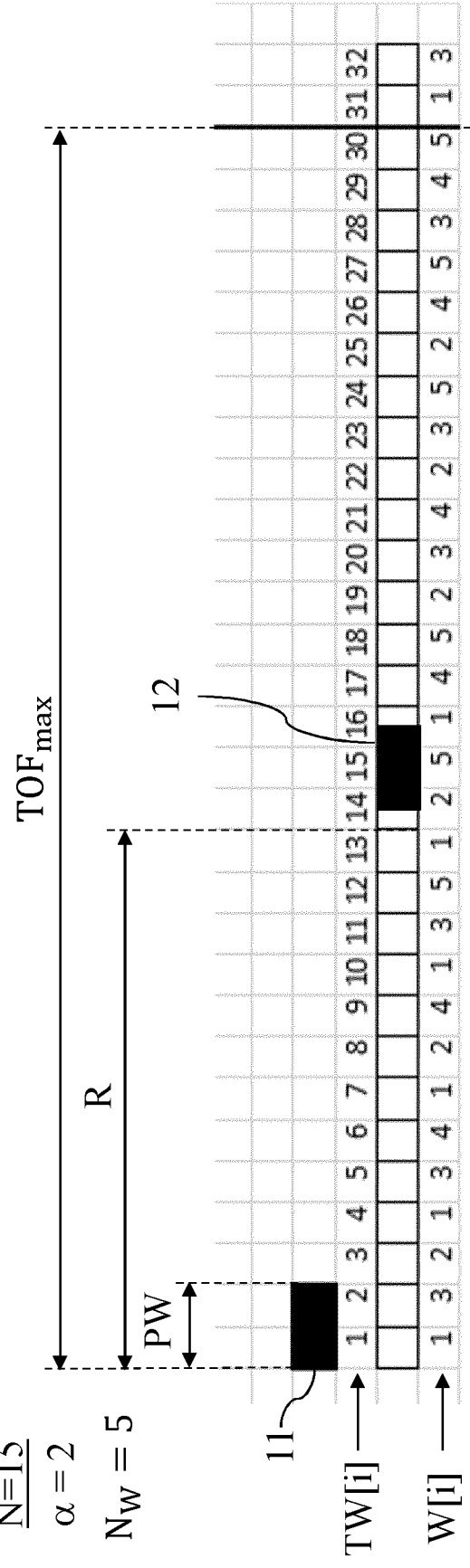

As shown on FIG. 4, FIG. 6 and FIG. 8, each detection time window TW[i] is nearly equal to the ratio $PW/\alpha$ with PW being the pulse width of the emitted laser pulses 11 and $\alpha$ being the alpha factor that for the example of FIG. 4 and FIG. 5 is equal to 1 and for the example of FIG. 8 is equal to 2. In some embodiments, each of the detection time windows TW[i] is not necessarily exactly equal to the ratio $PW/\alpha$ and some amount of deviation might occur, as long as the detection time period $T_D$ is equal to the M times the ratio $PW/\alpha$. Generally, for each of the time windows TW[i], $(|(PW/\alpha)-TW[i]|/(PW/\alpha)) \leq 0.10$, preferably $(|(PW/\alpha)-TW[i]|/(PW/\alpha)) \leq 0.05$, more preferably $(|(PW/\alpha)-TW[i]|/(PW/\alpha)) \leq 0.02$. The person skilled in the art will select an optimum value depending on the equipment used and the final accuracy required for determining the distance to an object. In some embodiments, $(|(PW/\alpha-TW[i]|/(PW/\alpha)) \leq 0.01$.

For each of the detected spots of reflected laser light, the method comprises a step of obtaining exposure values $Q_i$ associated to the detection time windows TW[i] by accumulating amounts of reflected laser light detected in the detection time windows TW[i]. This accumulation is performed over all the pulses of the sequence of pulses of the pulsed laser beam producing the spot. Indeed, depending on the distance to the object in the scene that is reflecting the laser light, a different time of flight TOF will occur and hence the laser light can be detected in different time windows depending on the distance to be measured.

If $\alpha=1$, and as the pulse width PW is nearly the same as the width of the detection time windows, the reflected pulse 12 will be detected in either two consecutive detection time windows or in a single detection time window. In FIG. 4, some arbitrary TOF examples are shown illustrating that the reflected pulse is generally overlapping two consecutive time windows.

For some object distances, and if $\alpha=1$, the reflected laser light can also be detected in a single time window. For example, if the first detection time window coincides with the emission of the pulse 11, i.e. if no delay time window $T_{DL}$ is applied, and if the distance to an object to be measured corresponds to a time of flight that is equal to or a multiple of the pulse width PW, the reflected laser light will be detected in a single detection time window. Similarly, if a delay time window $T_{DL}$ is applied and if the distance to an object to be measured corresponds to a time of flight that is equal to the delay time window $T_{DL}$ plus a multiple of the pulse width PW then the reflected laser light is detected in single detection time window.

More generally, for any value of a equal or larger than one, the reflected laser light is detected in either a or in $\alpha+1$ consecutive detection time windows.

According to the method of invention, the pulse frequency $F_P$, illustrated on FIG. 2, is determined such that $F_P \leq 1/((N+1) \times PW+T_{DL})$. The upper limit of the pulse frequency is defined such that reflected laser light as reflected from objects located at the maximum distance $D_{max}$ are detected before a subsequent pulse is emitted. Generally, the pulse frequency is lower than the upper limit of $1/(((N+1) \times PW)+T_{DL})$ to keep the average laser power within limits defined for example for eye safety reasons or to avoid aliasing problems or to perform 2D measurements In embodiments, the pulse frequency $F_P$ of a pulse train 50, as illustrated on FIG. 2, is typically in the kHz range, for example between 10 kHz and 500 kHz.

In some embodiments, the frequency $F_P$ is determined such that $1/((2 \times N \times PW)+T_{DL}) F_P \leq 1/(((N+1) \times PW)+T_{DL})$.

The method according to the invention provides a further step of determining object distances for each of the detected spots of reflected laser light. The object distance is determined by first identifying in what corresponding time windows reflected laser light is detected. In a second step, an object distance $D_S$, with $Ds \leq D_{max}$, to an object of the scene is calculated based on the identification of the corresponding detection time windows identified and/or the obtained exposure values obtained in the identified detection time windows as further discussed in more detail below.

With a prior art timing diagram, as for example shown on FIG. 1, only two detection time windows are used, and hence the object distance can be determined based on the amount of laser light detected in the two time windows. On the other hand, with the timing diagram according to the invention, as shown for example on FIG. 4, it is not known in advance in what detection time windows the reflected laser light will be detected. Hence, after having performed the detection of reflected laser light during a sequence of pattern illuminations, the method according to the invention comprises the step of identifying detection time windows wherein laser light has been detected. This step is performed for each of the spots of reflected laser light detected. As mentioned above, with the method according to the invention, reflected laser light is detected in either a or in $\alpha+1$ consecutive detection time windows.

After reading out the data obtained in the detection time windows, various software algorithms can be used to perform the identification of the detection time windows having detected reflected laser light. Indeed, reflected laser light is either detected in a or in $\alpha+1$ consecutive detection time windows and hence by comparing the number of counts in each of the detection time windows, the α or $\alpha+1$ detection time windows having the highest number of counts can be distinguished from detection time windows having only detected background counts. Additionally, the algorithm can also take into account the expected intensity profile in the $\alpha+1$ detection time windows, where a lower intensity is expected in the earliest and the last detection time window where reflected laser light is detected and between the earliest and the last detection time window a higher and essentially the same intensity is expected. For the case where reflected laser light is detected in a detection time windows, an essentially same intensity is expected in a consecutive detection time windows. Remark that if for example α=1, the reflected laser light is detected in maximum two detection time windows, and hence there is always at least one detection time window available for background detection.

In embodiments, a fitting algorithm, e.g. using a block function, can be applied to determine the location of the detection time windows having the highest number of counts.

Following the identification of the detection time windows having detected reflected laser light, the distance to an object of the scene can be calculated based on the identified detection time windows.

In embodiments, as further discussed in more detail, the calculation of the object distance is based on the identified detection time windows and/or based on the exposure values obtained for at least an earliest and a last detection time window wherein reflected laser light is identified. In other embodiments, the calculation of the object distance is based on a counting of the number of detection time windows preceding the earliest detection time window wherein reflected laser light is identified. For α=1, an upper limit of the pulse width reduction factor N is mainly determined by the detector technology available for detecting the reflected laser light and especially the detector response time, for example the speed of a CMOS camera. For example, for $D_{max}$=100 meter and using a pulse width reduction factor of 10, the pulse width PW is equal to about 66 nanoseconds.

Such a pulse width is still compatible with for example current CMOS-based pixel sensor technology.

For α>1, the pulse with reduction factor N is determined in relation with the factor α. Indeed, as discussed above, the detection time window depends on both N and α. As will be discussed below, if detector technology is used comprising charge storage wells that needs to be opened and closed the detection time window should be kept in a time window compatible with CMOS technology. In embodiments, the product of N and α is equal or smaller than 1000, preferably equal or smaller than 500, more preferably equal or smaller than 100. The person skilled in the art will select a value for α and N based on the detection technology available and also based on the maximum distance $D_{max}$. The larger $D_{max}$, the larger the product α×N to be taken to obtain a detection time window having a given reduced width.

Formulas for Determining Distances to an Object

As the detection of the reflected laser light is performed in synchronization with the simultaneous emission of the pulses of the pulsed laser beams, based on the identification of what detection time windows have detected laser light, the time of flight of the laser light and hence the distance to the object can be determined.

The person skilled in the art will define formulas for calculating the distance to the object based on the identified detection time windows having detected laser light. Various options are possible to calculate the object distance. Examples of formulas to calculate the distances will be outlined here below. As will be discussed, in some embodiments, the formulas take into account the exposure values of some of the identified detection time windows, especially the exposure values of the earliest and the last detection time window wherein reflected laser light is identified. In other embodiments, the object distance is determined only based on the identification of what detection time windows have detected reflected laser light. In these embodiments, for determining the object distance, the number of detection time windows preceding the earliest detection time window having detected reflected laser light is being counted.

The formulas for calculating the distance $D_S$ when α=1, i.e. when the pulse width is equal to the detection time period, is first discussed. If reflected laser light is detected in two consecutive time windows i and i+1, the distance $D_S$ can be calculated with the following formula:

$$D_S = (T_{DL} \times c/2) + [(i-1) \times c \times PW + c \times PW \times Q_{i+1}/(Q_i + Q_{i+1})]/2,$$

wherein Qi and Qi+1 are the exposure values obtained in respectively the time window i and the time window i+1. Generally, exposure values are corrected for background events, resulting for example from ambient light reaching the detector or other background noise sources.

Alternatively, if reflected laser light is detected in two consecutive time windows i and i+1, the distance $D_S$ can also be calculated with the following alternative formula: $D_S = (T_{DL} \times c/2) + [i \times c \times PW - c \times PW \times Q_i/(Q_i + Q_{i+1})]/2$. This alternative formula is preferably used if the amount of reflected laser light in time window i is larger than the amount of reflected laser light in time window i+1.

On the other hand, if reflected laser light is only detected in one time window i, with i≥2, then the following formula can be used to calculated the distance to the scene: $D_S = (T_{DL} \times c/2) + [(i-1) \times c \times PW]/2$.

An example of a detection timing diagram wherein α=2 is schematically shown on FIG. 8. In this example the pulse width reduction factor N is equal to 15, i.e. the pulse width PW of an emitted pulse 11 is equal to the maximum time of flight divided by 15. As $\alpha=2$, the total number of detection time windows M is equal to $32=\alpha\times(N+1)$. For a detection timing diagram as shown in FIG. 8 wherein $\alpha>1$, formulas can also be deduced to determine the distance $D_S$.

If $\alpha>1$ then reflected laser light is detected in $\alpha+1$ detection time windows or in a detection time windows. For example, if $\alpha=2$, i.e. TW[i]=PW/2, the reflected laser light is detected in up to three consecutive time windows. Generally, for $\alpha=2$, a reflected pulse is observed partly in a time window TW[i], fully detected in time window TW[i+1] and partly detected in time window TW[i+2]. In some cases, depending on the location of the object in the scene, the reflected laser light can also be detected in two consecutive time windows TW[i] and TW[i+1]. For the example shown in FIG. 8, a reflected laser pulse 12 is detected in time windows 14 to 16.

If $\alpha\geq1$ and if reflected laser light is detected in $\alpha+1$ consecutive detection time windows then a more general formula for determining a distance according to the method of the present invention can be expressed as follows:

$$D_S = T_{DL} \times c/2 + Z \times (TOF_{max} - T_{DL}) \times c/2,$$

$$\text{with } Z = (R+z)/(\alpha \times N) \text{ and } z = Q_b/(Q_a + Q_b),$$

In this formula, $D_S$ is the object distance, $Q_a$ is the exposure value obtained for an earliest detection time window TW[a] of the consecutive detection time windows wherein reflected laser light is identified, $Q_b$ is the exposure value obtained for a last detection time window TW[b] of the consecutive detection time windows wherein reflected laser light is identified and R is an integer number counting the number of detection time windows preceding the earliest time window TW[a]. In the example shown on FIG. 8, reflected laser light is detected in time windows 14 to 16 and the earliest detection time window TW[a] is detection time window 14 and the detection time window 16 is the last detection time window TW[b] wherein reflected laser light is detected. The integer R in this example is equal to 13, corresponding to the number of detection time windows preceding the earliest detection time window number 14. Those exposure values $Q_a$ and $Q_b$ have to be construed as exposure values that have been corrected for background counts, e.g. resulting from background light. Hence, if reflected laser light is detected in $\alpha+1$ consecutive detection time windows, and when the above formula is used, the distance is determined by taking into account exposure values obtained in the identified detection time windows.

If $\alpha\geq1$ and reflected laser light is detected in a consecutive detection time windows, instead of $\alpha+1$ consecutive detection time windows, then the object distance $D_S$ can be calculated using expression:

$$D_S = T_{DL} \times c/2 + \left(R/(\alpha \times N)\right) \times (TOF_{max} - T_{DL}) \times c/2,$$

with R being the integer number counting the number of detection time windows preceding the earliest detection time window wherein reflected laser light is identified. Hence, if reflected laser light is detected in a consecutive detection time windows, the distance is determined without using the exposure values obtained in the identified detection time windows.

In some embodiments, the object distance $D_S$, for both the cases where reflected laser light is detected in $\alpha$ or in in $\alpha+1$ consecutive detection time windows, can be determined without taking into account the exposure values obtained in the identified detection time windows. Indeed if the detection time window is short, for example by selecting a large value for a and/or for the pulse width factor N, an earliest detection time window wherein reflected laser light is detected during only a portion of the detection time window can be ignored for the distance calculation. In these embodiments, the object distance $D_S$ can be calculated using the same expression as mentioned above, namely: $D_S = T_{DL} \times c/2 + (R/(\alpha \times N)) \times (TOF_{max} - T_{DL}) \times c/2$, with R being the integer number counting the number of detection time windows preceding the earliest detection time window wherein reflected laser light is identified. This approach for calculating the object distance can for example be applied for cases where a and/or N or large and/or for cases where the distances to be determined are large, for example hundred meter or more.

Pulse Frequency of Laser Light

The highest pulse frequency $F_P$ that can be reached with the method according to the invention is equal to $1/((N+1)\times PW+T_{DL})$. However, the pulse frequency can also be lower and be equal to for example $1/((N+1)\times PW+T_{DL}+(q\times PW))$, with $q\geq1$ and wherein $q\times PW$ is forming a delay time slot defined such that detection of false reflections resulting from reflections from objects in the scene located at distances larger than $D_{max}$ are eliminated to avoid aliasing. In other embodiments, a delay time slot can also be implemented for eye safety reasons in order to for example reduce the average power of the laser light emitted. When using a prior art timing diagram as shown in FIG. 1 having only two detection time windows, i.e. a diagram where N=1, an additional time slot, subsequent to the first and second time window is generally provided for background measurements. As discussed above, with the timing diagram according to the invention, an additional time slot for background measurements is not mandatory as a background estimate can always be obtained from one of the detection time windows TW[i] wherein no reflected laser light is detected and only background is detected.

However, in some embodiments according to the invention, the additional delay time slot $q\times PW$ mentioned above, can or can partly be used to perform additional background measurements. Hence, the detection time period $T_D$ has to be construed as a detection time period to detect reflected laser light, it does exclude that additional detection time windows, subsequent to the detection time period $T_D$, are used to detect for example background, or that additional time windows are used for any other suitable purpose.

In FIG. 5 examples are shown of time diagrams according to the invention wherein an additional delay time slot is provided subsequent to the detection time period $T_D$. The delay time slot subsequent to the detection time period is identified with reference 21 on FIG. 5. In these examples shown on FIG. 5, no predetermined delay time window $T_{DL}$ as discussed above was implemented and the synchronisation is performed, as illustrated, such that the emitted pulses 11 overlap with the first detection time window. In other embodiments, the predetermined delay time window $T_{DL}$ can additionally be implemented to delay the first detection time window with respect to the emission time window of the pulses, as discussed above. As discussed above, this additional delay time slot 21 can be used for multiple purposes, going from reducing false reflections, reducing average power for eye regulation purposes, or even for performing additional background measurements.

In embodiments, the pulse frequency $F_P$ is equal or smaller than $1/((N+1) \times PW+T_{DL}+IM)$, with IM being a time slot provided for imaging the scene with ambient light or a light source illuminating the scene to obtain a 2D photographic image of the scene such that distances determined with the TOF method can be combined with the photographic images for forming a 3D image of the scene. As mentioned above, it is not mandatory to provide an extra time slot for the measuring background required for correcting the exposure values, as there is always an time window available wherein no laser light is reflected. However, in some embodiments, an additional time slot is provided for measuring background for correcting and improving the 2D image.

Synchronization Between Pulse Detection and Pulse Emission

As discussed above, the spots of reflected laser light are detected in synchronization with the simultaneous emission of the pulses of the pulsed laser beams.

In embodiments wherein the delay time window $T_{DL}$, as specified above, is zero, the synchronization of the emission of the pulses of the laser beams and the detection of the reflected laser light is performed such that the first detection time window TW[1] is overlapping or at least partly overlapping with an emission time window of the pulses. In the embodiments shown on FIG. 4 and FIG. 5, where $\alpha=1$, the first time window TW[1] is illustrated to coincide, with the emission of the laser pulse 11, i.e. the pulse width of the pulse and the first time window are fully overlapping.

In other embodiments, the first detection time window TW[1] is partly overlapping with an emission time window of the pulses. This can happen for example when the first detection time window TW[1] is delayed with respect to the emission of the pulses. If this delay is smaller than the first detection time window, and as the detection time window has the same or nearly the same width as the pulse if $\alpha=1$, then there is always a partial overlap between the first time window and the emission of the pulses. In embodiments, the first detection time window can also partly overlap, i.e. not fully overlap, with the emission of the pulses if the pulse width and the detection time window are not exactly the same. More specifically, if $\alpha>1$, the pulse width PW is larger than the detection time window and hence when synchronizing, a partial overlap between the emission of the laser pulse and the first detection time window can occur. The first detection time window TW[1] is fully overlapping or at least partly overlapping with an emission time window of the pulses.

In embodiments, the first detection time window is partly overlapping with the emission time window of the pulses by starting the detection during the first detection time window TW[1] before emission of the laser pulse, i.e. the emission of the laser pulse is delayed with respect to the first detection time window. Hence, even if $T_{DL}$, as specified above, is zero, there is still some margin for synchronizing the emission of the laser pulse and the first detection time window and for example introducing a positive or negative delay by synchronizing such that there is only a partial overlap between the first detection time window and the emission of the laser pulse.

More generally, if a predefined delay time window $T_{DL}$, as defined above, is not zero, as shown for example on FIG. 6, then the synchronisation is performed such that the first detection time window TW[1] is delayed with respect to an emission time window of the pulses and with a delay equal to the delay time window $T_{DL}$.

Distance Accuracy, Temporal Precision

As mentioned above, by taking multiple frames and calculating an average object distance from the various object distances $D_S$ as obtained during each of the single frame measurements, the error on the calculated average object distance value is reduced with a factor $1/\sqrt{N_F}$ when compared to the temporal error of a single frame measurement, with $N_F$ being the number of frames. With the method according to the invention, the purpose is to obtain a high precision with a single frame measurement in order to reduce the number of frames required for determining a distance and even perform the distance measurement with a single frame.

Frames can be repeated at a frame rate $F_F$, which is generally much lower than the pulse frequency $F_P$. In FIG. 3 a repetition of frames 60 is schematically illustrated and the frame rate $F_F$ is indicated. In this example a repetition of three frames is shown, in practice the number of frame repetitions is generally much larger as generally, for example for a LIDAR device mounted in a car or a drone, distances are measured in a continuous way. As schematically illustrated on FIG. 3, following each pulse train 50, a processing time 65 is required to read out the exposure values and process the acquired data. The frame rate $F_F$ that can be reached is typically in the Hz range, in embodiments, the frame rate is for example between 5 Hz and 50 Hz.

A major advantage of the timing diagram according to the present invention, shown for example on FIG. 4, FIG. 6 and FIG. 8, is that the temporal precision of the distance measurement in a single frame is strongly improved when compared to the prior art timing diagram shown on FIG. 1. This is a consequence of the fact that the temporal precision is improved if the detection time window becomes smaller. When comparing the precision obtained with the current method with the precision obtained with the prior art timing diagram shown on FIG. 1 wherein two detection windows are used, an improvement with a factor equal to $\alpha \times N/\sqrt{\alpha}$ is obtained. Hence, if $\alpha=1$, the improvement factor is proportional with the divisional factor N.

With the prior art timing diagram, a high number of frames need to be taken to obtain a standard deviation $\sigma_{avg}=\sigma/\sqrt{N_F}$ on the calculated average distance that is within an acceptable value. The temporal error of a single frame measurement is here expressed as a standard deviation $\sigma$. A single frame measurement is a measurement based on a sequence of pulses 50 as for example shown on FIG. 2. With the improvement of the precision of the single frame measurement with the method according to the present invention, the number of frames $N_F$ can be reduced or the measurement can even be performed within a single frame. In this way, the distance to an object of the scene can be obtained much faster. The improvement of the precision and hence the reduction of number of frames is further discussed here below.

The temporal error, expressed as a standard deviation 6, for object distances having a corresponding time of flight located in a given detection time window TW[i], can be written as follows:

$$\sigma = \sigma_\zeta(\zeta, S, b, \sigma_{px}) \frac{c \times \left(\frac{PW}{\alpha}\right)}{2}$$

wherein $\sigma_\xi$ is a precision factor that is independent from the pulse width PW and only dependent on the total signal intensity S within one frame, the measured background b during one frame, the pixel noise $\sigma_{px}$, and a count ratio factor being equal to $Q_b/(Q_a+Q_b)$, with $Q_a$ and $Q_b$ being the exposure values, as detected in the earliest and in the last detection time windows where reflected laser light is detected.

More precisely, for $\alpha \geq 1$, the precision factor $\sigma_\xi$ mentioned in the formula above for $\sigma$ is proportional with the following factor:

$\sigma_\xi \sim \sqrt{\xi \times (1-\xi)/\alpha}$ with $z=Q_b/(Q_a+Q_b)$ wherein, as discussed above, $Q_a$ and $Q_b$ are the exposure values of respectively the earliest and the last detection time window wherein reflected laser light is detected.

Figure 9:
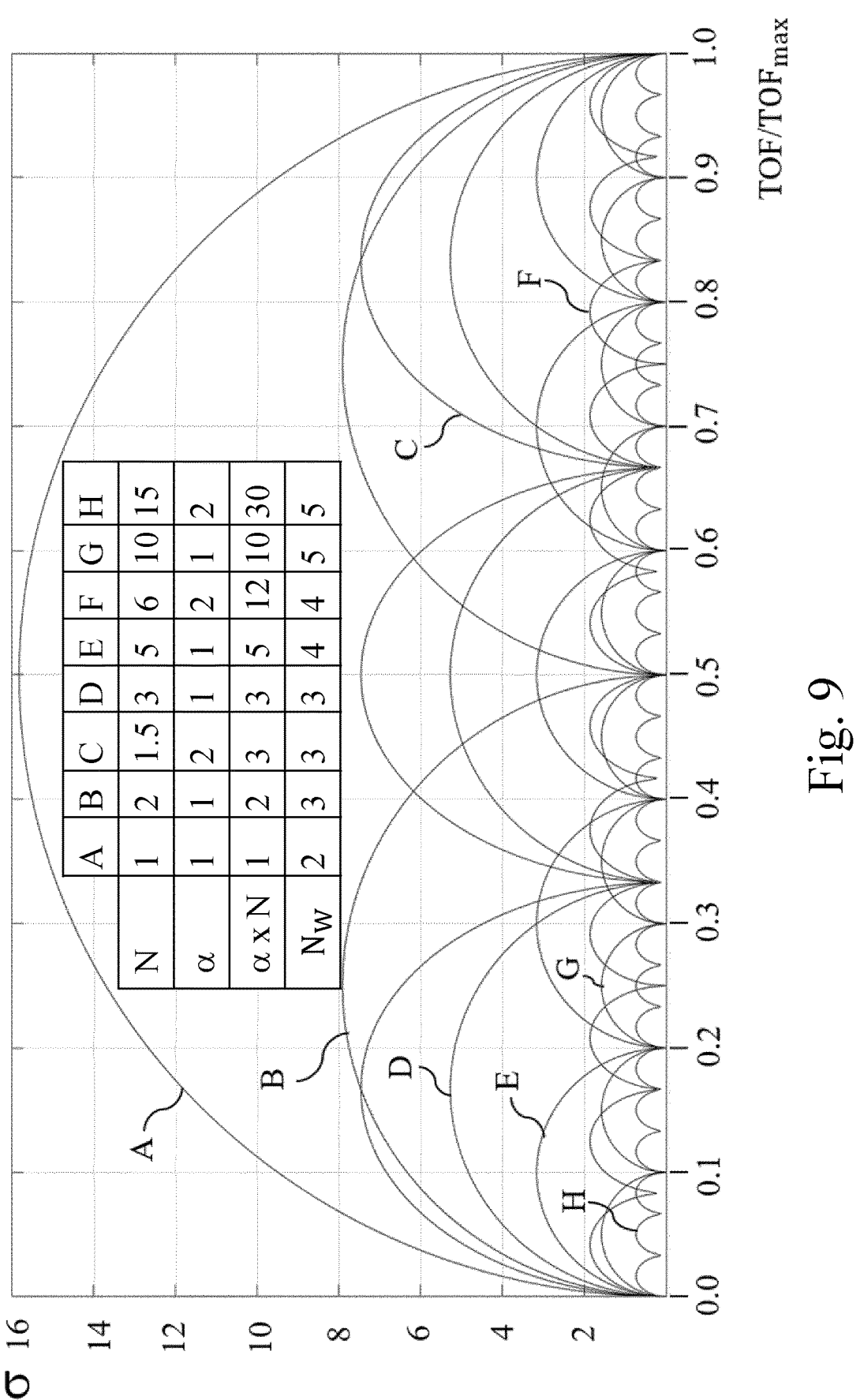

Examples of the temporal error $\sigma$ are shown on FIG. 9 for different values for the divisional factor N and the factor $\alpha$. The $\sigma$ values on FIG. 9 are relative values to illustrate the relative difference in $\sigma$ for the various examples shown. The various examples are identified with the letters A to H on FIG. 9 and the legend on FIG. 9 indicates the corresponding values for N and $\alpha$ selected. The values of sigma are here expressed as function of a ratio $D/D_{max}=TOF/TOF_{max}$, going from 0 to 1, i.e. covering the entire distance range for determining a distance. In this example the delay time window $T_{DL}$ is assumed zero. The prior art pulse timing diagram wherein $\alpha=1$ and $N=1$, as shown on FIG. 1, is used as a reference temporal error $\sigma$. With the prior art pulse timing diagram the value $\sigma$ has the largest value at $TOF/TOF_{max}=0.5$. As illustrated with the examples B to H, where $\alpha \times N \geq 2$, for each of these examples, the 6 value as function of $TOF/TOF_{max}$ expresses a repetitive arc-shaped pattern. Each arc represents the temporal error $\sigma$ within a detection time window, the detection time window being proportional to $1/(\alpha \times N)$ as discussed above. In FIG. 9 examples according to the invention are shown for $\alpha=1$ combined with $N=2$, 3, 5 and 10 and for $\alpha=2$ combined with $N=1.5$, $N=6$ and $N=15$. As illustrated on FIG. 9, when compared to the prior art timing diagram, with the new timing diagrams according to the invention the values of 6 are reduced with a factor $\alpha \times N/\sqrt{\alpha}$.

For example, for $\alpha=1$, by using a pulse width reduction factor $N=4$, the temporal precision is improved by a factor of four and the number of frames to be taken to obtain the same standard deviation for the calculated average object distance can be reduced by a factor of two. This however is on condition that the total number of photons emitted during the pulse train remains the same and background and noise contributions remain the same. If for example the number of pulses in the pulse train remains the same, then the number of photons emitted within a pulse needs to be increased by a factor of four if the pulse width reduction factor is four and if the purpose is to reduce the number of frames by a factor of two.

If $\alpha>1$, then the time detection windows are further reduced when compared to $\alpha=1$ and hence the precision of a single frame measurement is further improved. However, the precision improvement factor is not linear with $\alpha$ times N, instead the improvement factor is proportional with $\alpha \times N/\sqrt{\alpha}$ as mentioned above. This additional factor $\sqrt{\alpha}$ results from the fact that the maximum detectable laser light in a single detection time window is proportional with $1/\alpha$. For example, if $\alpha=2$ and N equal to 15, the improvement in precision when compared to the prior art shown on FIG. 1, is a factor of $30/\sqrt{2}=21.5$. If $\alpha=1$ and N equal to 15, the improvement in precision is a factor of 15.

Remark that the curves shown on FIG. 9, are theoretical curves assuming that no background counts are present. In practice the exposure values are to be corrected for background counts and hence depending on the amount of background, the improvement factors defined above can be slightly different after taking into account the background corrections.

Use of a Multi-Well Pixel Detector and Determination of N and $\alpha$

In embodiments, for performing the method according to the invention, the reflected laser light detection is performed with a laser light receiving device comprising a multi-well pixel detector having a plurality of pixels, and wherein each pixel comprises a light-sensitive area and a plurality of charge storage wells W[i] with i=1 to $N_W$, with $N_W$ being the number of charge storage wells, with $N_W \leq M$. These plurality of charge storage wells are configured for storing charges detected by the light-sensitive area during the detection time period $T_D$.

In embodiments, for each pixel, to each of the detection time windows TW[i] a charge storage well is associated and hence in these embodiments the number of charge storage wells $N_W$ is equal to the number of detection time windows M.

In preferred embodiments, the number of charge storage wells $N_W$ is lower than the number of detection time windows M. Therefore, in these embodiments, one or more charge storage wells are storing the charges of more than one detection time window. This allows to use a higher divisional factor N without increasing the number of charge storage wells. A relation is established to define what charge storage well is storing charges detected during what detection time window. To establish such a relation between detection time windows and charge storage wells a unique sequence of charge storage wells needs to be defined as outlined below.

In embodiments comprising a multi-well pixel detector, each sub-sequence of $\alpha+1$ consecutive time windows TW[k] to TW[k+$\alpha$], with k=1 to M−$\alpha$, is associated to an unique sequence of $\alpha+1$ charge storage wells of the plurality of charge storage wells W[i]. Hence M−$\alpha$ unique sequences of $\alpha+1$ charge storage wells are defined. These unique sequences of charge storage wells are configured such that when reflected laser light is detected in $\alpha$ or $\alpha+1$ charge storage wells, the corresponding detection time windows wherein reflected laser light is detected can be identified and the object distance being determined with the formulas discussed above. The unique sequences of charge storage wells and the association with the detection time windows define what charge storage well is used for storing charges during what detection time periods.

The unique sequences of $\alpha+1$ charge storage wells have to be construed as sequences of charge storage wells that are configured to allow to identify unambiguously in what earliest detection time window and in what last detection time window reflected laser light is detected.

For example if $\alpha=1$, the sequence $\alpha+1$ of charge storage wells is a pair and then if for example $N_W$ is equal to 3, then if pair 1-2 is defined as a unique pair of charge storage wells associated to a pair of detection time windows, then pair 2-1 is not a further unique pair. Indeed if both pairs 1-2 and 2-1 would be used, then the corresponding detection time windows where laser light is detected cannot be determined as no distinction between the two pairs can be made. On the other hand, the pair 3-1 and/or the pair 3-2 can be used as a further unique pair.

Similarly, if $\alpha=2$, for example sequence 1-2-3 can be defined as a unique sequence of charge storage wells associated to a sequence of three consecutive detection time windows, wherein well 1 and well 3 can detect for example laser light corresponding to respectively an earliest and a last detection time window. However, the sequence 3-2-1 cannot be used as a further unique sequence because if reflected laser light would be detected in wells 1, 2 and 3 one cannot determine in what detection time period the reflected laser is effectively detected. A further unique sequence can for example be configured using a fourth storage well 4 wherein the combination 4-2-3 can form a further unique sequence of three charge storage wells.

If for example $\alpha=4$ and $N_W$ is equal to 5, the sequence 1-2-3-4-5 could be selected as a unique sequence of 5 wells associated to a sequence of 5 consecutive detection time windows for detecting reflected laser light. In this sequence, in well 1 and well 5 reflected laser light can be detected that corresponds for example to an earliest and a last detection time period. If this sequence 1-2-3-4-5 is used as a unique sequence, then nor sequence 5-2-3-4-1, nor sequence 1-3-4-2-5, nor the sequence 5-3-4-2-1, nor the sequence 1-4-2-3-5, nor sequence 5-4-2-3-1, nor the sequence 1-4-3-2-5 and nor sequence 5-4-3-2-1 can be used as further unique sequences. Indeed if any of such further combinations of sequences of wells would be associated to another sequence of 5 consecutive detection time windows, no distinction could be made with reflected laser light detected during the detection time windows corresponding to the sequence 1-2-3-4-5.

In FIG. 8, an example is shown wherein N=15 and $\alpha=2$ and hence the number M of detection time windows is equal to 32, and wherein the number of charge storage wells $N_W$ is equal to 5, i.e. <M. In this example, as shown on FIG. 8, charge storage well TW[1] is for example operational for integrating charges during detection time windows 1, 4, 7, 10, 13, 16 and 31.

For these embodiments wherein a multi-well pixel detector is used wherein each pixel comprises a given number $N_W$ of charge storage wells, the divisional factor N and the alpha factor defining the number of detection time windows M=$\alpha\times$ (N+1) are selected such that the number of detection time windows M are not larger than a maximum value $M_{max}$ corresponding to the maximum number of unique sequences of $\alpha+1$ consecutive time windows that can be formed with the given number $N_W$ of charge storage wells.

For the examples shown on FIG. 9, the number of charge storage wells $N_W$ used are indicated in the legend. For the examples B to H, the number of charge storage wells used varies between 3 and 5.

Pairs of Charge Storage Wells, $\alpha=1$

As mentioned above the factor $\alpha$ can be equal or higher than one. First a number of embodiments with $\alpha=1$ will be discussed.

In embodiments, wherein N≥3 and wherein for each pixel of the multi-well pixel detector $N_W$<M, each pair TW[k] and TW[k+1] of successive time windows of the detection time windows is associated to an unique pair W[m] and W[n] of the charge storage wells. For example in FIG. 7, an example of N=10, is shown and hence the number of detection time windows is equal to 11. On FIG. 7, two examples are shown one with $N_W$=11 and one with $N_W$=5. For the embodiment where $N_W$=5, hence $N_W$<M, each pair of successive time windows is associated to an unique pair of charge storage wells. For example, as illustrated on FIG. 7, the successive detection time windows TW1 and TW2 are for example associated to the unique well pair W1 and W2, the successive detection time windows TW7 and TW8 are for example associated to the unique well pair W1 and W4, the successive detection time windows TW10 and TW11 are for example associated to the unique well pair W5 and W1. As mentioned above, with an unique pair of charge storage wells it is to be understood that for example a well pair W1-W2 is the same pair as well pair W2-W1.

In embodiments, wherein N≥3 and wherein for each pixel of the multi-well pixel detector $N_W$<M, at least one charge storage well of the plurality of charge storage wells is configured for accumulating and storing charges detected during two different time windows TW[k] and TW[m] of the detection time windows, and wherein the two different time windows are two non-successive time windows such that |m−k|>1. On FIG. 7, for the case with $N_W$=5, for example the charge storage well W5 is accumulating and storing charges from both detection time window TW5 and TW10, for example charge storage well W3 is accumulating and storing charges during detection time windows TW3 and TW6, for example charge storage well W1 is accumulating and storing charges during detection time windows TW1, TW7 and TW11.

In embodiments of the method according to the invention with $\alpha=1$, when applying the step of determining the pulse width PW and applying the pulse width reduction factor N, the pulse width reduction factor N is defined such that $N \leq N_{max}$ with $N_{max}=N_W!/((N_W-2)! \times 2)$, if the number of charge storage wells is odd, and $N_{max}=N_W!/((N_W-2)! \times 2)-((N_W!/((N_W-1)! \times 2))-1)$, if the number of charge storage wells is even. This maximum number $N_{max}$ defines the maximum number of unique pairs that can be formed with a given number of charge storage wells. When taking this upper limit for N as defined in the above formula, for a given number of wells the maximum number of time detection windows $M_{max}$ is equal to $N_{max}+1$.

Unique Sequence of $\alpha+1$ Charge Storage Wells, $\alpha>1$

Embodiments wherein $\alpha$ is higher than 1 will be further discussed. The advantage of using a factor $\alpha$ being higher than 1 is that for a given number $N_W$ of charge storage wells, the number of unique sequences of $\alpha+1$ charge storage wells that can be formed is higher and therefore for the same number of charge storage wells a shorter detection time window can be used, resulting in a an improved precision.

For example, if $\alpha=2$, i.e. TW[i]=PW/2, the reflected laser light is detected in up to three consecutive time windows. Hence one needs at least three charge storage wells to detect reflected laser light and a fourth charge storage well for measuring background. Generally, for $\alpha=2$, a reflected pulse is observed partly in a time window TW[i], fully detected in time window TW[i+1] and partly detected in time window TW[i+2]. In some cases, depending on the location of the object in the scene, the reflected laser light can also be detected in two consecutive time windows TW[i] and TW[i+1].

For $\alpha=2$ and for a given number of charge storage wells $N_W$, a maximum number $C_{max}$ of unique sequences of 3 charge storage wells can be calculated. For $N_W$ going from 4 to 10, $C_{max}$ is respectively equal to, 12, 30, 60, 105, 168, 252 and 360.

More generally, for any number of a the maximum number $C_{max}$ of unique sequences of $\alpha+1$ charge storage wells that can be formed with a number $N_W$ of charge storage wells can be calculated.

Mathematical algorithms for calculating the maximum number $C_{max}$ of unique sequences and for establishing the unique sequences of charge storage wells are known in the art. For example for calculating the sequences of three unique charge storage wells when using for example five charge storage wells, as shown on FIG. 8, an iterative program is used taking into the boundary conditions that the sequence of charge wells must allow to unambiguously detected laser light detected in an earliest and a last detection time window. In this example shown on FIG. 8, with $\alpha=2$ and $N_W=5$, the maximum number $C_{max}$ of unique sequences of three charge storage wells that can be formed is equal to 30. Therefore, in this example the maximum pulse divisional factor $N_{max}$ that can be used is equal to 15.

The maximum number $C_{max}$ of unique sequences define a maximum pulse width reduction factor $N_{max}$ with $\alpha \times N_{max} = C_{max}$. Hence when using a CMOS-based multi-well pixel detector with a given number $N_W$ of charge storage wells per pixel, the pulse width reduction factor N is selected such that N is equal or smaller than $N_{max}$.

For a selection of a relatively small a and a relatively small number of charge storage wells $N_W$, the maximum number $C_{max}$ of unique sequences can become large. For example with $\alpha=2$ and $N_W=4$, $C_{max}=12$, with $\alpha=2$ and $N_W=6$, $C_{max}=60$. By taking $\alpha=3$ or more and taking $N_W=7$ or more, hundreds of unique combinations can be formed and $C_{max}$ becomes larger than 100. If taking $\alpha=4$ or more and taking $N_W=9$ or more, even thousands of unique combinations can be formed and $C_{max}$ becomes larger than 1000.

LIDAR Device for Determining Distances to a Scene

According to a second aspect of the invention, a LIDAR device for determining distances to one or more object of a scene is provided. An embodiment of a LIDAR device 1 is schematically illustrated on FIG. 10.

Such a LIDAR device 1 comprises a projector 100 configured for illuminating the scene 99 with an illuminating pattern 150. The pattern is formed by a plurality of spatially separated pulsed laser beams wherein each pulsed laser beam comprises a sequence of pulses. The pulses of the plurality of pulsed laser beams are emitted simultaneously. As discussed above, a sequence of pulses, also named pulse train, is schematically illustrated on FIG. 2.

Preferably the laser light is produced by a semiconductor laser. In embodiments, the laser light is produced by a semiconductor light source comprising a vertical-cavity surface-emitting (VCSEL) laser array to produce the desired pattern. In order for the system to operate optimally, even at long ranges and with high levels of ambient light (e.g., in daylight), a VCSEL for use in embodiments of the present invention is preferably arranged to emit a maximum optical power per spot per unit of area. More preferably, the lasers should have a minimal wavelength spread; a particularly low wavelength spread can be achieved with monomode lasers. Thus, substantially identical pulses can reproducibly be generated, with the necessary spatial and temporal accuracy.

The projector comprises besides the semiconductor laser a projection lens configured to illuminate the scene with the light pattern within a defined field of view.

In embodiments, the wave length of the laser light produced by the laser is between 800 nm and 1600 nm.

The LIDAR device further comprises a light receiving device 300 comprising a CMOS-based multi-well pixel detector configured for detecting spots of reflected laser light. The multi-well pixel detector comprises a plurality of pixels wherein each pixel comprises a light-sensitive area for detecting laser light. As discussed above, those spots of reflected laser light represent the spatially separated beams as reflected by one or more objects of the scene. A CMOS-based multi-well pixel detector is for example disclosed in WO2017068199.

Figure 10:
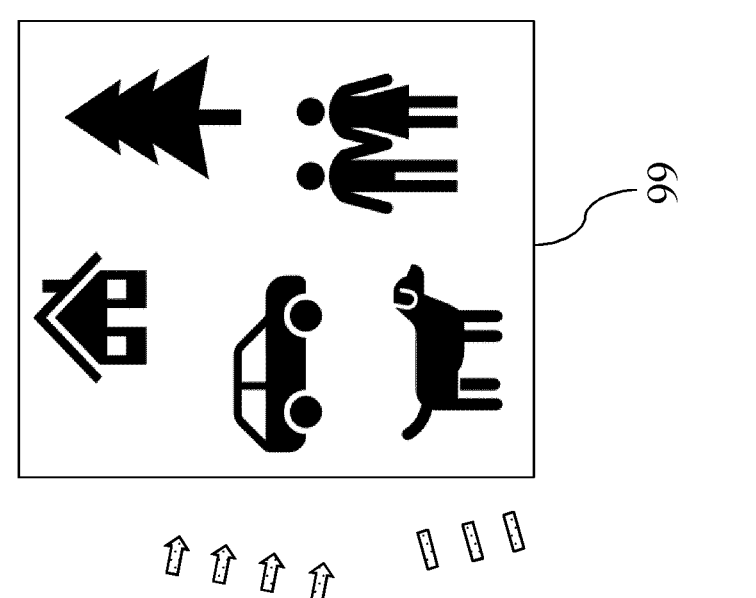
Figure 10:
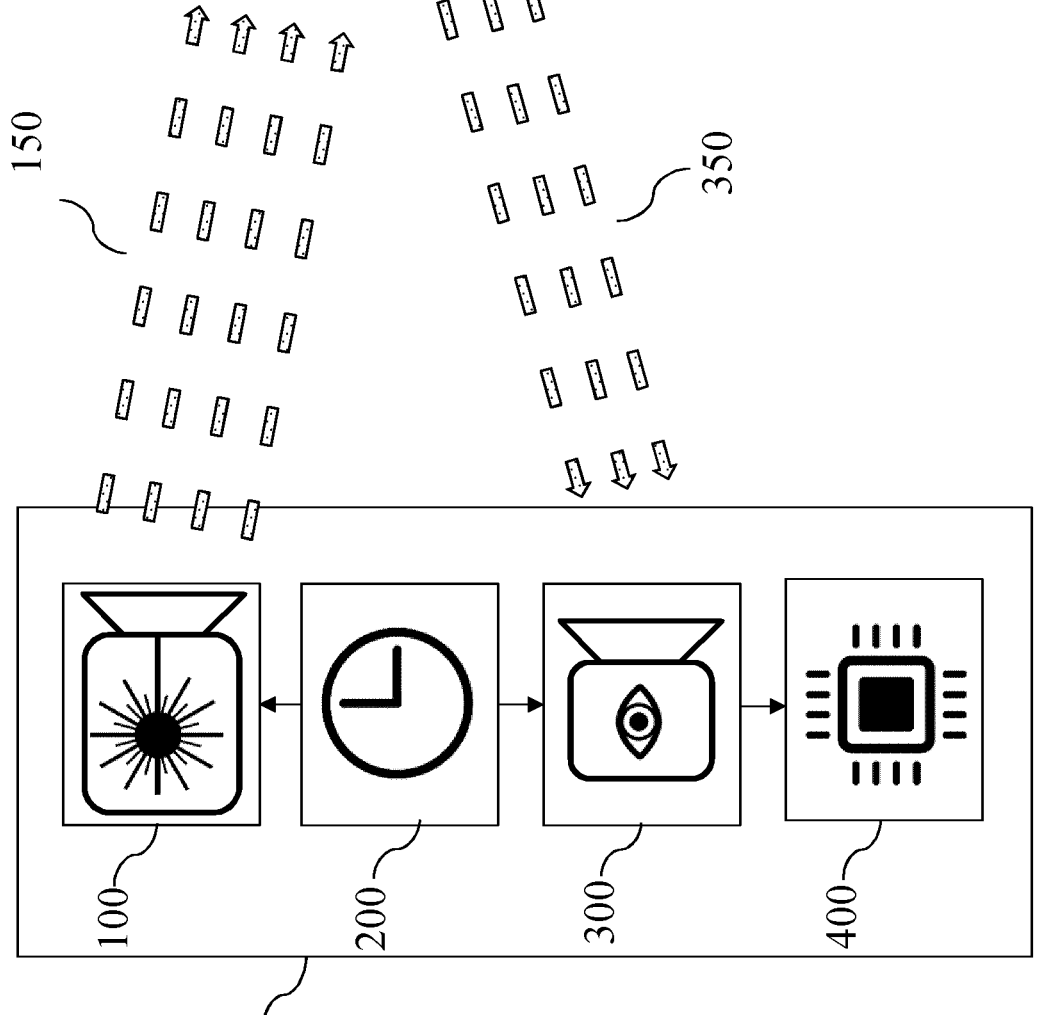

The reflected laser light is schematically indicated on FIG. 10 with reference 350 and is forming a reflected pattern comprising pulses of reflected laser light. The reflected pattern is observed on the CMOS-based multi-well pixel detector as a plurality of spots. Such a spot has to be construed as the intersection of a laser pulse with the detection surface of the detector.

The CMOS-based multi-well pixel detector according to the invention is configured and operable for detection of reflected laser light during a detection time period $T_D$ that falls within the pulse period $P_P$ of the pulsed laser beams, and wherein the detection time period is divided in M consecutive detection time windows TW[i] such that $$T_D = \sum_{i=1}^{i=M} TW[i] = M \times (PW/\alpha),$$

with M being the number of detection time windows. This number M is equal to $\alpha \times (N+1)$ and $M \geq 3$, preferably $M \geq 4$, more preferably $M \geq 5$. In embodiments, the consecutive detection time windows TW[i], for i=1 to M, are of substantially equal duration. The factor $\alpha$ is an integer number discussed above when discussing the method according to the invention, with $\alpha \geq 1$, preferably $\alpha \leq 10$, more preferably $\alpha \leq 5$.

In embodiments, the detection time windows are nearly equal to the pulse width, i.e. for each of the detection time windows TW[i], with i=1 to M: $(|PW-TW[i]|/PW) \leq 0.10$, preferably $(|PW-TW[i]|/PW) \leq 0.05$, more preferably $(|PW-TW[i]|/PW) \leq 0.02$.

The CMOS-based multi-well pixel detector according to the invention is configured and operable for obtaining, for each of the detected spots of reflected laser light, exposure values $Q_i$ associated to the detection time windows TW[i]. The exposure values are obtained by accumulating amounts of electrical charge representative of reflected laser light as detected in the detection time windows TW[i], such that a correlation is established between detected laser light and a time window wherein the laser light is detected. The accumulation of the electrical charges is performed for all the pulses of the sequence of pulses.

The detection of reflected laser light is to be performed in synchronization with the emission of the sequence of laser pulses. Therefore, the LIDAR device comprises a controller 200 for controlling the projector 100 and the light receiving device 300 so as to detect and accumulate the reflected laser light in synchronization with the sequence of pulses emitted. In embodiments, the controller comprises synchronization means which may include a conventional clock circuit or oscillator.

In embodiments, the controller 200 is configured for performing the synchronisation such that the first detection time window TW[1] is overlapping or at least partly overlapping with a pulse emission time window of the pulses. The emission time window of the pulses has to be construed as the time window wherein the pulses are emitted and hence this emission time window has the width of the pulse width. Examples of the overlapping or the partly overlapping first detection time window with the emission time window of the pulses have been discussed above when discussing the method according to the invention.

In other embodiments, the controller 200 is configured for performing the synchronisation between the emission of the pulses and the detector such that the first detection time window TW[1] is delayed with respect to an emission time window of the pulses and the delay is equal to a predefined delay time window $T_{DL}$.

Preferably, the predetermined delay time factor is equal or lower than $2 \times D_{min}/c$, which $D_{min}$ being a minimum distance, such that objects located at or near the minimum distance $D_{min}$ can be detected and the distance be determined.

The CMOS-based multi-well pixel detector has to be construed as a 2D array of pixels, each pixel forming an individual detector for detecting laser light. Indeed, each pixel comprises an individual light-sensitive area and at least three charge storage wells. The number of charge storage wells depends on the number of detection time windows M.

More generally, each pixel of the CMOS-based multi-well pixel detector comprises a plurality of charge storage wells W[i] with i=1 to $N_W$, $N_W$ being the number of charge storage wells, with $N_W \leq M$.

The charge storage well is a reservoir to accumulate charges resulting from the laser light falling on the light-sensitive area of the pixel. Each well has a separate transfer gate controlled by an external signal which is synchronized with the pulse of the laser light and synchronized with the specified N+1 detection time windows. In this way, by controlling the transfer gates, reflected laser light detected by the light-sensitive area of the pixel in a given time window TW[i] will be stored in the associated well W[k].

The light receiving device further comprises a lens system to project the reflected laser light onto the multi-pixel detector. For example, if all the pulses of the illumination pattern are reflected by objects of the scene, an image of the pattern is obtained in the focal plane of the light receiving device where the light-sensitive area of the multi-pixel detector is located.

The LIDAR device according to the invention comprises processing means 400 configured to, for each of the detected spots of reflected laser light, identify in what detection time windows of the consecutive detection time windows reflected laser light is detected, i.e. exposure values have been obtained. The reflected laser light is detected in either a or in α+1 consecutive detection time windows. The processing means further calculate an object distance $D_S$ based on the identification of the detection time windows and/or based on the earliest and last exposure values obtained in the identified detection time windows. The method discussed above for performing the identification is generally implemented as a computer algorithm for performing this identification. Besides the identification algorithm, a further computer algorithm is used to calculate the distances $D_S$ using the formulas and various options for performing this calculation as discussed above. In embodiments, the processing means 400 typically comprise a processor, a microprocessor or a computer.

Remark that when the multi-pixel detector detects a spot of laser light as reflected from the scene, this reflected laser light is detected in a plurality of pixels in the multi-pixel detector and to determine the amount of reflected laser light a sum is generally made of detected laser light as detected in the plurality of pixels. In embodiments, when performing the sum, a weight factor associated to pixels is taken into account. As the illumination is performed with a pattern of spatially separated spots, the various spots detected on the multi-pixel detector are also spatially separated such that there is no or few overlap between the various spots detected.

When determining exposure values of reflected laser light the processing means are configured to subtract a back-ground. This background is generally obtained from detection time windows wherein no reflected laser light is detected.

In some embodiments, the determination of the time windows having detected laser light is performed on the level of the CMOS detector before reading out the data. In these embodiments, the CMOS based multi-well pixel detector comprises for example a comparator configured for discriminating between background counts and laser light.

The number $N_W$ of wells W[k] of each of the pixels in the pixel-detector is not necessarily equal to the number M of time windows TW[i]. In preferred embodiments, $N_W < M$, and hence in these embodiments, as there are less storage wells than time windows, at least one charge storage well of the plurality of charge storage wells is configured for storing charges detected during two different time windows of the detection time windows TW[i]. As discussed above, these two different time windows are two non-successive time windows.

In embodiments wherein $M \geq 4$ and α=1, for each pixel of the multi-well pixel detector $N_W < M$, each pair of two successive detection time windows is associated to an unique pair of charge storage wells.

More general, for α≥1, each sub-sequence of α+1 consecutive time windows TW[k] to TW[k+α], with k=1 to M−α, is associated to an unique sequence of α+1 charge storage wells of the plurality of charge storage wells W[i] such that the detection time windows wherein reflected laser light is detected are unambiguously identifiable. The definition of unique sequences of charge storage wells have been discussed above.

If α=1, for a given number $N_W$ of charge storage wells, the number of unique pair combinations P that can be made can be expressed as a number of permutations P and can be calculated as follows: $P=N_W!/((N_W-2)! \times 2)$.

Figure 7:
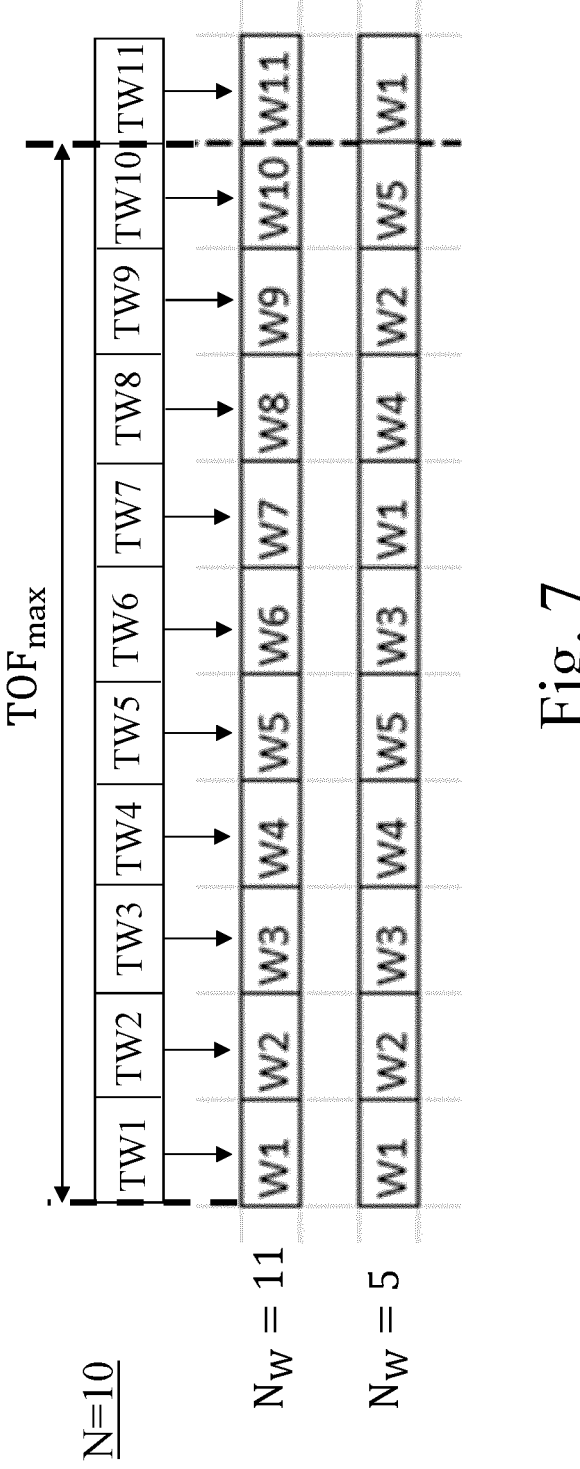

The symbol "!" is the permutation symbol. For example, with three wells, three unique pair combinations can be formed, i.e. 1-2, 1-3 and 2-3. With for example 4 wells, 6 unique combinations can be formed: i.e. 1-2, 1-3, 1-4, 2-3, 2-4 and 3-4. With five wells, 10 unique combinations can be formed and hence when using for example 11 detection time windows, only 5 wells are required. In FIG. 7, an example is shown where the pulse width reduction factor N is equal to 10 and hence 11 detection time windows are provided according to the invention. In the top part of FIG. 4, an example is shown wherein each detection time window has its proper well and hence each pixel would require 11 wells. In the bottom part of FIG. 7, only 5 wells are used to form 10 unique pair combinations for the 11 detection time windows. Advantageously, with the formation of unique well pairs, the number of required wells is strongly reduced and the complexity of the CMOS-based multi-well pixel detector is reduced.

For α=1 and for a given number of storage wells $N_W$ one can also calculate a maximum pulse width reduction factor $N_{max}$ that could be applied for reducing the pulse width as discussed above. If the number of wells is odd, then the following formula can be applied to calculate the maximum reduction factor that can be applied with a given number of wells: $N_{max}=N_W!/((N_W-2)! \times 2)$ For example, if the number of wells is 5 then $N_{max}=10$. This also implies that the maximum number of detection time windows $M_{max}$ that can be used for a given number of wells can be expressed as: $M_{max}=1+N_W!/((N_W-2)! \times 2)$ If α=1 and the number of wells $N_W$ is even, the formula for calculating a maximum pulse width reduction factor $N_{max}$ is different and can be expressed as follows:

$N_{max}=N_W!/((N_W-2)!\times2)-((N_W!/((N_W-1)!\times2))-1)$     For example, if the number of wells is 4 then $N_{max}=5$. Similarly, the maximum number of detection time windows $M_{max}$ in case the number of wells is even can be expressed as: $M_{max}=1+N_W!/((N_W-2)!\times2)-((N_W!/((N_W-1)!\times2))-1)$ In embodiments, $5\leq M\leq6$ and $N_W=4$. In other embodiments, $7\leq M\leq11$ and $N_W=5$. In further embodiments, $M=4$ and $N_W=3$.

More generally if $\alpha>1$ known mathematical algorithms can be used to define the maximum number $C_{max}$ of unique sequences of charge storage wells that can be used to unambiguously be able to identify the detection time windows wherein reflected laser light is detected.

In preferred embodiments, the LIDAR device according to the invention is configured such that the pulse width PW is related to the number of detection time windows M and this relation can be expressed as: $PW==(TOF_{max}-T_{DL})/((M-\alpha)/\alpha)$, with $TOF_{max}=(2\times D_{max}/c)$, wherein $TOF_{max}$ is a maximum time of flight $TOF_{max}$ and $D_{max}$ is a maximum distance associated to the maximum time of flight, c is the speed of light, and $T_{DL}$ is the predefined delay time window discussed above, with $0\leq T_{DL}\leq(0.6\times TOF_{max})$, preferably $0\leq T_{DL}\leq(0.4\times TOF_{max})$, more preferably $0\leq T_{DL}\leq(0.2\times TOF_{max})$.

As mentioned above, $D_{max}$ is to be construed as an operational range of the LIDAR device, generally a maximum operational range. In embodiments this maximum operational range $D_{max}$ of the LIDAR device according to the invention is for example in the following range: 30 meter $D_{max}\leq1000$ meter.

The pulse width PW following the above definition is typically to be expected in the nanosecond to microsecond range. Assuming, for example a maximum range of 100 meter and 300 meter, then the corresponding time of flight for the laser light, back and forth, is respectively 666 nanoseconds and 2 microseconds and hence depending on the pulse width reduction factor N defined, or the equivalent number of time detection windows, and depending of the required maximum operational distance $D_{max}$ of the LIDAR device, the pulse length PW is to be expected in a range between 33 nanoseconds and 1 microsecond. The pulse with reduction factor is generally equal or lower than twenty.

In embodiments, the projector of the LIDAR device is configured for providing the pulsed laser beams at a pulse frequency $F_P$ such that $F_P\leq1/((M/\alpha)\times PW+T_{DL})$.

The LIDAR device according to the invention is suitable for integration into a vehicle. The LIDAR device being integrated in a vehicle is arranged to operatively cover at least a part of an area surrounding the vehicle. The at least part of an area is corresponding to the scene that requires the distance determination. The area that is covered depends on the field of view (FOV) of the LIDAR device and in embodiments the FOV is for example 30°×10° or 120°×30° or any other suitable field of view.

The invention claimed is:

1. A method for determining distances to one or more objects in a scene by illuminating the scene with pulsed laser light and detecting reflected laser light in relation to a time of flight of the laser light, and wherein the one or more objects are located in a distance range between a minimum distance ($D_{min}$) and a maximum distance ($D_{max}$), with $0\leq D_{min}\leq0.6\times D_{max}$, with $D_{min}$ and $D_{max}$ being respectively said minimum and said maximum distance, the method comprising steps of A) determining a pulse width (PW) for said pulsed laser light that is smaller than a maximum time of flight ($TOF_{max}$) associated to said maximum distance ($D_{max}$) such that $$PW = (TOF_{max} - T_{DL})N, \text{ with } TOF_{max} = 2\times D_{max}/c,$$

wherein PW is said pulse width, $D_{max}$ is said maximum distance, c is the speed of light, $TOF_{max}$ is said maximum time of flight, $T_{DL}$ is a predetermined delay time window with $0\leq T_{DL}\leq2\times D_{min}/c$, and N is a pulse width reduction factor, B) determining a pulse frequency ($F_P$) for said pulsed laser light such that $F_P\leq1/((N+1)\times PW+T_{DL})$, with $F_P$ being said pulse frequency and wherein $F_P=1/P_P$, with $P_P$ being a pulse period ($P_P$), C) determining a detection time period ($T_D$) for detecting reflected laser light within the pulse period ($P_P$) of the pulsed laser light, and wherein $T_D=(N+1)\times PW$, with $T_D$ being said detection time period, and dividing said detection time period ($T_D$) in a number of consecutive detection time windows TW[i], with i=1 to M and M being the number of detection time windows, and wherein:

$$M = \alpha\times(N+1) \text{ and } T_D = \sum\nolimits_{i=1}^{i=M} TW[i] = M\times(PW/\alpha),$$

and with $\alpha$ being an integer number expressing a number of detection time windows per pulse width, with $\alpha\geq1$, and wherein $\alpha$ and N are selected such that $\alpha\times N\geq2$, D) illuminating the scene with a spot pattern formed by a plurality of spatially separated pulsed laser beams, and wherein each pulsed laser beam is comprising a sequence of pulses (50) having said pulse width (PW) determined in step A) and having said pulse frequency ($F_P$) determined in step B), and wherein the pulses (12) of each of the plurality of pulsed laser beams are emitted simultaneously, E) following each simultaneous emission of pulses when illuminating the scene as defined in step D), detecting spots of reflected laser light during the consecutive detection time windows TW[i] of the detection time period ($T_D$) defined in step C), and wherein said spots are representing said spatially separated pulsed laser beams as being reflected by the one or more objects in the scene, and for each simultaneous emission of pulses performing said detecting of spots of reflected laser light in synchronization with the emission of the pulses of the pulsed laser beams:

a) if said delay time window ($T_{DL}$) is zero then performing said synchronisation such that the first detection time window TW[1] is overlapping or at least partly overlapping with an emission time window of the pulses, and b) if said delay time window ($T_{DL}$) is not zero then performing said synchronisation such that the first detection time window TW[1] is delayed with respect to an emission time window of the pulses and with a delay equal to said delay time window ($T_{DL}$), F) for each of the detected spots of reflected laser light, obtaining exposure values ($Q_i$) associated to said detection time windows TW[i] by accumulating amounts of reflected laser light as detected in the detection time windows TW[i], and wherein said accumulation is performed for all the pulses of the sequence of pulses, G) for each of the detected spots of reflected laser light:

i) identifying in what detection time windows of said consecutive detection time windows TW[i] said exposure values ($Q_i$) representing reflected laser light are obtained, ii) calculating an object distance ($D_S$) based on the identified detection time windows, and wherein said calculated object distance ($D_S$) corresponds to a distance between a detector detecting the spot of reflected laser light and an object in the scene or a portion of an object in the scene having caused the reflected laser light being detected.

2. A method according to claim 1 wherein $F_P \leq 1/((N+1) \times PW + T_{DL} + (q \times PW))$, with $q \geq 1$ and wherein $q \times PW$ is forming a delay time slot defined such that detection of false reflections resulting from reflections from objects in the scene located at distances larger than said maximum distance ($D_{max}$) are reduced and/or $q \times PW$ is forming a delay time slot defined for reducing an average emitted power of laser light for eye safety purposes.

3. A method according to claim 1 wherein steps D) to G) are repeated a plurality of times and wherein for each of the reflected spots an average object distance is obtained by taking an average of the object distances ($D_S$) obtained in step G).

4. A method according to claim 1 wherein step G) ii) further comprises if reflected laser light is detected in $\alpha+1$ consecutive detection time windows, then calculate the object distance ($D_S$) using expression:

$$D_S = T_{DL} \times c/2 + Z \times (TOF_{max} - T_{DL}) \times c/2,$$

$$\text{with } Z = (R+z)/(\alpha \times N) \text{ and } z = Q_b/(Q_a + Q_b),$$

wherein $D_S$ is said object distance, $Q_a$ is the exposure value obtained for an earliest detection time window TW[a] of said consecutive detection time windows wherein reflected laser light is identified, $Q_b$ is the exposure value obtained for a last detection time window TW[b] of said consecutive detection time windows wherein reflected laser light is identified and R is an integer number counting the number of detection time windows preceding said earliest detection time window TW[a], or if reflected laser light is detected in $\alpha$ consecutive detection time windows, then calculate the object distance ($D_S$) using expression:

$D_S = T_{DL} \times c/2 + (R/(\alpha \times N)) \times (TOF_{max} - T_{DL}) \times c/2$, with R being the integer number counting the number of detection time windows preceding the earliest detection time window wherein reflected laser light is identified.

5. A method according to claim 4 wherein said exposure values $Q_a$ and $Q_b$ are obtained after background correction, and wherein said background correction is based on an amount of background values detected in at least one detection time window of said consecutive detection time windows, said at least one detection time window being different from said identified detection time windows wherein reflected laser light is detected.

6. A method according to claim 1 wherein said detection of reflected laser light is performed with a laser light receiving device comprising a multi-well pixel detector having a plurality of pixels, and wherein each pixel comprises a light-sensitive area and a plurality of charge storage wells W[i] with i=1 to $N_W$, with $N_W$ being the number of charge storage wells with $N_W \leq M$, and wherein said plurality of charge storage wells are configured for storing charges detected by the light-sensitive area during said detection time period ($T_D$).

7. A method according to claim 6 wherein $N_W < M$, $M \geq 4$ and wherein each sub-sequence of $\alpha+1$ consecutive detection time windows TW[k] to TW[k+$\alpha$], with k=1 to M−$\alpha$, is associated to an unique sequence of $\alpha+1$ charge storage wells of said plurality of charge storage wells W[i] such that the detection time windows wherein reflected laser light is detected are unambiguously identifiable.

8. A method according to claim 7 wherein said pulse width reduction factor (N) is equal or lower than a maximum pulse width reduction factor ($N_{max}$) and wherein $\alpha \times N_{max} = C_{max}$, with $N_{max}$ being the maximum pulse width reduction factor and $C_{max}$ being the maximum number of unique sequences of $\alpha+1$ charge storage wells that can be formed with a number $N_W$ of charge storage wells.

9. A method according to claim 1 wherein $\alpha \geq 2$.

10. A LIDAR device for determining distances to one or more objects of a scene, comprising a projector configured for illuminating the scene with a spot pattern formed by a plurality of spatially separated pulsed laser beams wherein each pulsed laser beam comprises a sequence of pulses having a pulse width (PW), and wherein the pulses of each of the plurality of pulsed laser beams are emitted simultaneously, a light receiving device comprising a CMOS-based multi-well pixel detector configured for detecting spots of reflected laser light representing said spot pattern as reflected by the one or more objects of the scene, and a controller for controlling said projector and said light receiving device so as to detect and accumulate said reflected laser light in synchronization with said simultaneous emission of the pulses of the pulsed laser beams, wherein said CMOS-based multi-well pixel detector is configured for i) detecting reflected laser light during a detection time period ($T_D$)

within a pulse period ($P_P$) of the pulsed laser beams, and wherein the detection time period ($T_D$) is divided in a number of consecutive detection time windows TW[i] with i=1 to M, M being the number of detection time windows, $M \geq 3$, and wherein $$T_D = \sum_{i=1}^{i=M} TW[i] = M \times (PW/\alpha),$$

$\leftrightarrow T_D$ being said detection time period, PW being said pulse width, $\alpha$ is an integer number with $\alpha \geq 1$, ii) for each of the detected spots of reflected laser light, obtaining exposure values ($Q_i$) associated to said detection time windows TW[i] by accumulating amounts of electrical charge representative of reflected laser light as detected in the detection time windows TW[i], and wherein said accumulation is performed for all the pulses of the sequence of pulses, and wherein said controller is configured for performing said synchronisation i) such that the first detection time window TW[1] is overlapping or at least partly overlapping with an emission time window of the pulses, or, alternatively, ii) such that the first detection time window TW[1] is delayed with respect to an emission time window of the pulses and said delay is equal to a predefined delay time window ($T_{DL}$), and wherein said LIDAR device comprises a processor configured to, for each of the detected spots of reflected laser light, i) identifying in what detection time windows of said consecutive detection time windows TW[i] said exposure values ($Q_i$) representing reflected laser light are obtained, ii) calculating an object distance (DS) based on the identified detection time windows.

11. A LIDAR device according to claim 10 wherein said CMOS-based multi-well pixel detector comprises multiple pixels and wherein each pixel comprises a light-sensitive detection area and a plurality of charge storage wells W[i], with i=1 to $N_W$ and $N_W$ being the number of charge storage wells, with $N_W \leq M$, and wherein said plurality of charge storage wells are configured for storing charges detected by the light-sensitive area during said detection time period ($T_D$).

12. A LIDAR device according to claim 11, wherein $N_W < M$, $M \geq 4$, and wherein each sub-sequence of $\alpha+1$ consecutive detection time windows TW[k] to TW[k+$\alpha$], with k=1 to M–$\alpha$, is associated to an unique sequence of $\alpha+1$ charge storage wells of said plurality of charge storage wells W[i] such that the detection time windows wherein reflected laser light is detected are unambiguously identifiable.

13. A LIDAR device according to claim 11 wherein $\alpha=1$ and wherein the number of detection time windows (M) is defined such that $M \leq 1+Nw!/((N_W-2)! \times 2)$, if the number of charge storage wells is odd, or $M \leq 1+Nw!/((N_W-2)! \times 2)-((N_W!/((N_W-1)! \times 2))-1)$, if the number of charge storage wells is even.

14. A LIDAR device according to claim 10 wherein $\alpha \geq 2$.

15. A LIDAR device according to claim 10 wherein: $PW=(TOF_{max}-T_{DL})/((M-\alpha)/\alpha)$, with $TOF_{max}=2 \times D_{max}/c$, wherein $TOF_{max}$ is a maximum time of flight ($TOF_{max}$) and $D_{max}$ is a maximum distance associated to the maximum time of flight, the maximum distance ($D_{max}$) being an operational range of the LIDAR device, c is the speed of light, and $T_{DL}$ is said predefined delay time window with $0 \leq T_{DL} \leq 0.6 \times TOF_{max}$.

16. A LIDAR device according to claim 10 wherein said projector is operable for generating said pulsed laser beams at a pulse frequency ($F_P$) such that $F_P \leq 1/((M/\alpha) \times PW+T_{DL})$, with $F_P$ being said pulse frequency.

17. A vehicle comprising a LIDAR device according to claim 10 wherein the LIDAR device is arranged to operatively cover at least a part of an area surrounding the vehicle, said at least part of an area corresponding to said scene.

18. A method according to claim 1, wherein $0 \leq D_{min} \leq 0.2 \times D_{max}$.

19. A method according to claim 1, wherein $\alpha \leq 5$.

20. A method according to claim 1, wherein $\alpha \times N \geq 4$.

21. A LIDAR device according to claim 10, wherein $M \geq 5$.

22. A LIDAR device according to claim 10, wherein $\alpha \leq 5$.

23. A LIDAR device according to claim 15, wherein $0 \leq T_{DL} \leq 0.2 \times TOF_{max}$.

* * * * *